(12) United States Patent
Meschenmoser et al.

(10) Patent No.: US 10,773,894 B2
(45) Date of Patent: Sep. 15, 2020

(54) TRANSFER DEVICE FOR A TRANSPORT VESSEL

(71) Applicant: Carl Zeiss Vision International GmbH, Aalen (DE)

(72) Inventors: Ralf Meschenmoser, Essingen (DE); Arne Schulz, Leonberg (DE); Dennis Klora, Ellwangen (DE)

(73) Assignee: Carl Zeiss VIsion International GmbH, Aalen (DE)

( * ) Notice: Subject to any disclaimer, the term of this patent is extended or adjusted under 35 U.S.C. 154(b) by 0 days.

(21) Appl. No.: 16/445,434

(22) Filed: Jun. 19, 2019

(65) Prior Publication Data

US 2019/0329987 A1    Oct. 31, 2019

Related U.S. Application Data

(63) Continuation of application No. PCT/EP2017/082665, filed on Dec. 13, 2017.

(30) Foreign Application Priority Data

Dec. 19, 2016 (EP) .................................... 16205093

(51) Int. Cl.
  *B65G 37/02* (2006.01)
  *B65G 35/06* (2006.01)
  *B65G 47/53* (2006.01)
(52) U.S. Cl.
  CPC ............. *B65G 37/02* (2013.01); *B65G 35/06* (2013.01); *B65G 47/53* (2013.01);
  (Continued)

(58) Field of Classification Search
  CPC ...... B65G 37/02; B65G 47/53; B65G 47/648; B65G 29/00; B65G 35/06;
  (Continued)

(56) References Cited

U.S. PATENT DOCUMENTS 5,078,257 A * 1/1992 Carter, Jr. ............. B23P 21/004
                                                 198/346.2
5,111,750 A * 5/1992 Nozaki .................. B65G 37/02
                                                 104/172.4

(Continued)

FOREIGN PATENT DOCUMENTS

DE     19506670 A1    8/1996
DE    102007059303 A1    6/2009
(Continued)

OTHER PUBLICATIONS

International Search Report issued in PCT/EP2017/082665, to which this application claims priority, and English-language translation thereof, dated Mar. 23, 2018.
(Continued)

*Primary Examiner* — Mark A Deuble
(74) *Attorney, Agent, or Firm* — Thrive IP®; Georg M. Hasselmann

(57) ABSTRACT

A transfer device for a transport container has a plurality of rotation/transport devices arranged in the form of a matrix. Each of the rotation/transport devices has a bearing for the transport container, wherein the bearing is formed at least as a three-point bearing and each of the rotation/transport devices has a dedicated drive for rotation purposes and a dedicated drive for transportation purposes.

20 Claims, 27 Drawing Sheets

(52) U.S. Cl.
CPC .. *B65G 2201/0235* (2013.01); *B65G 2203/04* (2013.01); *B65G 2207/14* (2013.01); *B65G 2207/18* (2013.01)

(58) Field of Classification Search
CPC ........ B65G 2201/0235; B65G 2207/18; B65G 2203/04; B65G 2207/14; B24B 41/005
See application file for complete search history.

(56) References Cited

U.S. PATENT DOCUMENTS

| | | | |
|---|---|---|---|
| 5,577,596 A | 11/1996 | Van Essen | |
| 5,626,080 A | 5/1997 | Trenner et al. | |
| 6,082,521 A * | 7/2000 | Maier | B07C 3/02 198/349.6 |
| 6,425,477 B1 | 7/2002 | Karasawa | |
| 8,490,781 B2 | 7/2013 | Meschenmoser et al. | |
| 9,840,373 B2 | 12/2017 | Schneider | |
| 2003/0161714 A1 | 8/2003 | Blattner et al. | |
| 2005/0269184 A1* | 12/2005 | Enya | B65G 37/02 198/369.2 |
| 2009/0099686 A1 | 4/2009 | Yoshikawa et al. | |
| 2013/0192954 A1 | 8/2013 | Fourney | |
| 2015/0332948 A1* | 11/2015 | Ikeda | B66C 19/00 700/230 |
| 2016/0145053 A1 | 5/2016 | Vetter et al. | |
| 2016/0300291 A1* | 10/2016 | Carmeli | G06Q 30/0635 |
| 2019/0300290 A1* | 10/2019 | Hofer | B65G 21/10 |

FOREIGN PATENT DOCUMENTS

| | | | |
|---|---|---|---|
| DE | 202012011690 U1 | 5/2013 | |
| EP | 0519339 A1 * | 12/1992 | .......... B65G 47/648 |
| EP | 1375389 A1 | 1/2004 | |
| EP | 1947035 A1 | 7/2008 | |
| EP | 3064455 A1 | 9/2016 | |
| EP | 2321200 B1 | 11/2016 | |
| JP | 01156225 A | 6/1989 | |
| JP | 2009137687 A | 6/2009 | |
| WO | 03013992 A1 | 2/2003 | |
| WO | 2008006644 A1 | 1/2008 | |
| WO | 2013131656 A2 | 9/2013 | |
| WO | 2015173689 A1 | 11/2015 | |

OTHER PUBLICATIONS

Written Opinion issued in PCT/EP2017/082665, to which this application claims priority, dated Jun. 28, 2018.
International Preliminary Examination Report issued in PCT/EP2017/082665, to which this application claims priority, and English-language translation thereof, dated Jun. 20, 2019.

* cited by examiner

TRANSFER DEVICE FOR A TRANSPORT VESSEL

CROSS REFERENCE TO RELATED APPLICATIONS

This application is a continuation application of international application PCT/EP2017/082665, filed Dec. 13, 2017, which claims priority to European patent application EP 16205093.4, filed Dec. 19, 2016, both of which are hereby incorporated by reference in their entireties.

TECHNICAL FIELD

The disclosure relates to a transfer device for a transport container for spectacle lenses.

Further, the disclosure relates to a method for producing a spectacle lens from a spectacle lens blank.

BACKGROUND

Until now, the formation of a process line from a plurality of process devices has been conventional within the scope of spectacle lens production, the spectacle lens blanks to be processed passing therethrough in succession. Then, the process line is set, for example, to a certain sequence of process steps and a certain surface design and certain finishing of the spectacle lenses.

Usually, all process devices and transport devices, which transport the spectacle lens blanks to the respective process devices of the process line, are controlled by a central controller. In particular, which process device processes which spectacle lens blank in what manner is set centrally, for example.

Use of a multiplicity of transport devices for transporting the spectacle lens blanks to the respective process devices is known from the related art.

By way of example, there are link chain conveyor belts as described in WO 03/013992 A1. There are also rail systems of the type described in DE 195 06 670 A1. Further, roller conveyor systems exist, as are disclosed in EP 1 947 035 A1, for example. Finally, conveyor belts or belt conveyors are also known. An exemplary embodiment of a conveyor belt or belt conveyor can be gathered from DE 20 2012 011 690 U1, for example.

In general, not all process devices of a process line are strung in succession on a transport track formed by one or more transport devices; instead, at least some of these process devices are situated next to the transport track. Moreover, there regularly is not just one transport track but a plurality of transport tracks next to one another. Finally, there are also crossing or branching transport tracks. Firstly, this requires the option of transferring the spectacle lens blanks from the transport track on which they are transported to the respective process device in which they should be processed further and, secondly, this requires the option of transferring the spectacle lens blanks from one transport track to an adjacent transport track or from a currently transporting transport track to a transport track crossing or branching off the latter. Appropriate transfer devices adopt this object.

The related art discloses a multiplicity of transfer devices. A selection of these will be presented below.

DE 20 2012 011 690 U1 and WO 2013/131656 A2 each describe installations for producing spectacle lenses. The corresponding installations comprise a plurality of separate processing devices and belt conveyors or conveyor belts for transporting the spectacle lens blanks to be processed to and from the processing devices. The installation comprises a plurality of transport tracks, which are formed by belt conveyors or conveyor belts, and transfer devices crossing the transport tracks at right angles, the transfer devices likewise being formed by belt conveyors or conveyor belts. The belt conveyors or conveyor belts forming the transfer device, which are arranged transversely to the transport tracks, are raiseable and lowerable. By raising or lowering, the transport containers for belts transporting spectacle lens blanks, of the belt conveyors or conveyor belts of the transfer device can be brought into a plane lying either above or below the plane of the belts, provided to transport the transport containers, of the belt conveyors or conveyor belts of the transport tracks. If the belts of the belt conveyors or conveyor belts of the transfer device are in the raised state, the transport container only lies on the belts of the belt conveyors or conveyor belts of the transfer device and a transfer of the corresponding transport container onto an adjacent, branching or crossing transport track or to a process device is possible. If the belts of the belt conveyors or conveyor belts of the transfer device are in the lowered state, the transport container only lies on the belts of the belt conveyors or conveyor belts of the transport track and transport along this transport track is possible.

A similar transport and transfer system, albeit based on driven rollers instead of the belt conveyors or conveyor belts, can be gathered from WO 2008/006644 A1.

The link chain conveyor belts according to WO 03/013992 A1 are equipped with switches, which likewise operate on the principle of raising and lowering.

DE 10 2007 059 303 A1 discloses an installation with a main conveyor belt, which has at least two tracks circulating in the same direction. An outer track serves as an overtaking track, on which workpieces or workpiece carriers that should not be supplied to processing are transported onward. A change from one transport track to another transport track is implemented by sliders and associated stamps. Moreover, transverse conveyors with conveyor belts running in the opposite direction are assigned to each processing station, wherein workpieces or workpiece carriers to be processed are offloaded by means of corresponding switches from the main conveyor belt to the transverse conveyors for the purposes of processing in the respective processing station.

EP 1 947 035 A1, from which the disclosure proceeds, describes a roller system. A transport track is formed by a multiplicity of rollers, which are arranged in succession with their axes transverse to the transport direction. A transport container lies on a plurality of these rollers that form the transport track. One or more of these rollers are driven by a motor-type drive; in one described and sketched exemplary embodiment, a transfer device is formed from twenty short rollers, which are arranged in matrix-like fashion and which form the crossing of two crossing transport tracks. Five short rollers in each case span approximately the length of the rollers forming the transport track.

Each short roller is a constituent part of a cell. Each cell comprises a dedicated drive for driving the roller about its roller axis (i.e., its cylinder axis). Further, the cell comprises an additional dedicated drive for rotating the roller about a central axis extending perpendicular to its roller axis. The transport direction and alignment of a transport container lying on a plurality of the short rollers can be set or changed by an appropriate choice and change in the rotational speed of the respective roller about its roller axis and a corresponding choice and change in the alignment of the roller axis by rotation about the central axis.

US 2003/0161714 A1 describes a storage and buffer system for transport containers that are used in semiconductor manufacturing. The system comprises rotation means in order to transfer the transport container from the conveyor belt into the storage and buffer system, or vice versa.

EP 3 064 455 A1 discloses a conveyor device with one or more rotatable conveyor means.

A conveyor device with a grid-like structure for transporting transport containers between process stations can be gathered from US 2009/0099686 A1. A rotary conveyor means is arranged at each grid point. The transport to each rotary conveyor means is implemented by means of non-rotatable linear conveyor means. Such a conveyor device with a grid-like structure is also described in U.S. Pat. No. 6,425,477 B1.

Rotatable roller conveyor means, inter alia, are gathered from US 2013/0192954 A1.

WO 2015/173689 A1 relates to a conveyor system for conveying containers. Linear and rotary conveyor means are constituent parts of the conveyor system.

JP2009137687A discloses rotation/transport devices arranged in matrix-like fashion. A transport container is borne simultaneously on the bearing surfaces of a plurality of rotation/transport devices of the rotation/transport device matrix. Adjacent rotation/transport devices can be rotated through 45° with respect to one another such that the transport direction changes during the transport of the transport containers. As a consequence of the rotation, the transport container can describe a quarter orbit. It is also possible for the transport to be implemented at an angle of 45° with respect to the original direction.

SUMMARY

It is an object of the disclosure to provide a transfer device for a transport container for spectacle lenses or spectacle lens blanks, which equally allows transfers between transport tracks and between a transport track and a process device to be realized and which is usable in flexible fashion. Furthermore, a production method for producing spectacle lenses from spectacle lens blanks is to be provided, in which the transition from one process step to the next can be designed flexibly.

This object is achieved by a transfer device as disclosed herein. Exemplary embodiments and refinements of the disclosure are disclosed below.

The transfer device according to the disclosure for a transport container comprises a plurality of rotation/transport devices arranged adjacent to one another in matrix-like fashion. In general, a transport container for spectacle lenses or spectacle lens blanks is designed for receiving two or possibly four spectacle lenses or spectacle lens blanks and associated order papers, spectacle frames and accessories. By way of example, a typical transport container is described in EP 2 321 200 B1. Such a transport container regularly has a substantially cuboid design, usually open to the top, with a width of less than 40 cm and a length of less than 50 cm and a height of regularly less than 20 cm. Within the scope of the present disclosure, a matrix is understood to mean, quite generally, a structure in the style of a table with fields or cells that are assignable to rows and columns. In a plan view, the rotation/transport devices are arranged like the fields or cells of a table having an integer number of rows and an integer number of columns. At least one of the numbers of rows or columns must be greater than one in this case in order to form a table. In relation to the disclosure, a rotation/transport device denotes a device that is suitable, firstly, for transporting (or conveying) the transport container in a linear direction and, secondly, for rotating the transport direction of the transport container.

Each of the rotation/transport devices has a bearing for the transport container, the transport container being borne by the bearing for transportation purposes. Deviating from the embodiment described in EP 1 947 035 A1, the transport container is not borne only in punctiform fashion; instead, the bearing is embodied at least as a three-point bearing. In the present case, embodied as (at least) three-point bearing is understood to mean that (at least) three bearing points are present for the transport container, the bearing points not being situated along a straight line (straight) and in each case among themselves having a distance that is as large as possible, for example greater than 3 cm. The bearing must be designed in such a way that the transport container can be borne thereby in untiltable fashion in the absence of external forces. Similar to a three-legged stool that cannot wobble, the transport container is necessarily borne securely at each of the three points as a result of this procedure. Expressed differently, the bearing for the transport container is chosen in such a way that one or more transport containers find space in their entirety on each of the rotation/transport devices. By way of example, a single transport roller facilitates at best a punctiform bearing or, in the case of a cylindrical embodiment, a straight line bearing and no non-linear bearing comprising at least three points.

Within the scope of the present disclosure, process devices should be understood to mean any devices in which at least one process step can be implemented on the respective spectacle lens blank in order to convert the latter into the final spectacle lens blank or finished spectacle lens.

Very generally, the term process device comprises all types of processing devices, conditioning devices and control devices, such as, e.g., devices for blocking, cooling, heating, moistening, drying, gassing, shaping and, in particular, machining, applying, polishing, checking and measuring, coating and marking.

Each of the rotation/transport devices has a dedicated (independent) drive for rotation purposes and a dedicated (independent) drive for transportation purposes. In this context, the term dedicated means that it is an integral component of the respective rotation/transport device, unlike, e.g., the example shown in FIGS. 28 and 29 of US 2013/192954 A1, where there is an external and consequently non-dedicated motor (denoted by reference sign 940 there) for rotation purposes, which rotates the device, and, additionally, for transportation purposes, not a dedicated but an external motor that drives a belt conveyor (denoted by reference sign 930 there), which in turn puts rollers of the device into rotation. Consequently, each of the rotation/transport devices can operate independently and can be activated and deactivated independently. Hence, it is possible to deactivate individual rotation/transport devices for servicing or repair purposes, without having to deactivate the entire matrix and hence having to put an entire assembly line off-line. Each rotation/transport device can be removed or unplugged by a few hand movements, together with the dedicated drive for rotation purposes and the dedicated drive for transportation purposes.

In summary, each of the rotation/transport devices within the matrix therefore has a dedicated (independent) drive for rotation purposes and a dedicated (independent) drive for transportation purposes, in such a way that each individual rotation/transportation device can be taken from the matrix and inserted into the matrix together with its dedicated drive for rotation purposes and with its dedicated drive for transportation purposes, which is separate from the rotational drive, in a manner representing a coherent module.

The problem set forth at the outset is solved in its entirety by this embodiment.

In a first exemplary embodiment, the bearing is formed by one or more belt conveyors.

Conventional transport devices have double belt conveyors, which can be used in this exemplary embodiment. The bearing for the transport containers on a rotation/transport device, which is set by the belts of the double belt conveyors in the present exemplary embodiment, is chosen in such a way that one or more transport containers find space.

Instead of being realized by belt conveyors, the bearing may also be realized by one or more link chains, by one or more belts or by one or more rollers, which are required to transport (or to convey) the respective transport container in the linear direction.

In a further exemplary embodiment, the disclosure provides for the bearing to be alignable in discrete steps. Expressed differently, the bearing and hence the linear transport device of the transport container can be rotated in discrete steps in this exemplary embodiment. Transfers and transportation between the rotation/transport devices among themselves or between the rotation/transport devices and the process devices or between the rotation/transport devices and pure transport devices are then only possible in certain, predetermined transport directions.

It was found to be particularly advantageous if the bearing is alignable in 45° steps. In this embodiment, it is possible to transfer a transport container not only between rotation/transport devices of a line or a column of the matrix, but also in a diagonal direction between mutually adjacent rotation/transport devices of adjacent lines and adjacent columns.

A further exemplary embodiment of the present disclosure consists of the bearing being alignable in discrete orientations. Thus, according to this exemplary embodiment, only orientations of the transport direction along a first transport track, along a transport track arranged perpendicular thereto and along a transport track arranged at any other angle are possible. In this way, the transfer device can be flexibly adapted to the arrangement of the components of a respective production system.

It was found to be advantageous if the bearing of the transfer device is alignable in exactly three discrete orientations or in exactly four discrete orientations or in exactly five discrete orientations or in exactly six discrete orientations or in exactly seven discrete orientations or in exactly eight discrete orientations. This exemplary embodiment allows servicing of, for example, all transport tracks arranged at an angle with respect to one another in 45° steps and all transfer device matrices larger than 2×2.

Only a few of the set of the different matrix configurations for transfer devices are of outstanding importance. In particular, the disclosure considers an arrangement of the rotation/transport devices in the form of a 3×2 matrix, a 4×2 matrix, a 5×2 matrix, a 3×3 matrix or a 3×4 matrix as particularly advantageous. Finally, arrangements of the rotation/transport devices as a combined 2×4+(2×2) matrix or a combined 3×4+(2×2) matrix are also very suitable for forming highly efficient production systems.

Another aspect relates to the option of embodying the drive for rotation purposes to be reversible. As an alternative or in addition thereto, the drive for transportation purposes can naturally also have a reversible embodiment. The option of rotation in both directions, possibly in combination with the option of transportation in both directions, allows an increase in the transfer and transport speeds for a transport container, without increasing the outage probability.

In a further embodiment, the disclosure provides for each of the rotation/transport devices to have a coupling device that is complementary to another of the rotation/transport devices. Hence, it is possible to remove individual rotation/transport devices or parts thereof for servicing or repair purposes without having to take the entire matrix off-line. The increase in efficiency is enormous.

The complementary coupling device can be embodied as an alternative or in addition to a complementary mechanical coupling and/or a complementary open-loop and/or closed-loop control-type coupling.

It was found that for the application described above, each of the rotation/transport devices should typically have a grid dimension of between 20 cm×20 cm and 50 cm×50 cm. In the present case, a grid dimension is understood to mean the area required for each of the rotation/transport devices in the matrix assembly in the case of the plan view from above. Such a grid dimension allows the transportation of transport containers of conventional dimensions.

In a further configuration of this exemplary embodiment, it is typical for the bearing to cover no more than 50% of the area defined by the grid dimension. This allows use in an ISO Class 5 cleanroom because a laminar flow with speed output of between 0.2 and 0.43 m/s can pass through along the product plane. A laminar flow of 0.43 m/s is typical.

It was further found to be desirable for each of the rotation/transport devices to have a detection device for the transport container. Hence it is possible, firstly, for the transport path for the transport container to be set exactly and, secondly, for a possibly removed transport container to be returned to the process at any point.

A further exemplary embodiment of the disclosure consists of equipping each of the rotation/transport devices with a status reporting device. By way of example, such a status reporting device can report the current operational state and the readiness of the respective rotation/transport device to the computer controlling the production system.

The method according to the disclosure for producing a spectacle lens from a spectacle lens blank comprises the step of transporting the spectacle lens blank in a transport container using a transfer device for the transport container comprising a plurality of rotation/transport devices arranged adjacent to one another in matrix-like fashion, wherein each of the rotation/transport devices has a bearing for the transport container, wherein the bearing is embodied at least as a three-point bearing for the transport container and/or formed by one or more belt conveyors, by one or more link chains, by one or more belts or by one or more rollers. The disclosure is wherein each of the rotation/transport devices has a dedicated drive for rotation purposes and in that each of the rotation/transport devices has a dedicated drive for transportation purposes.

Each of the rotation/transport devices has a dedicated drive for rotation purposes and a dedicated drive for transportation purposes. Consequently, each of the rotation/transport devices can operate independently and can be activated and deactivated independently. Hence, it is possible to deactivate individual rotation/transport devices for servicing or repair purposes, without having to deactivate the entire matrix and hence having to put an entire assembly line off-line. Typically, each rotation/transport device can be removed or unplugged by a few hand movements.

The problem set forth at the outset is solved in its entirety by this embodiment.

In an exemplary embodiment of the method, the above-described method step of transportation is performed between different process devices of a process line. In this way, these are flexibly operable, as a result of which idle states are reduced or avoided.

BRIEF DESCRIPTION OF THE DRAWINGS

The disclosure will now be described with reference to the drawings wherein.

DESCRIPTION OF EXEMPLARY EMBODIMENTS

Figure 1:
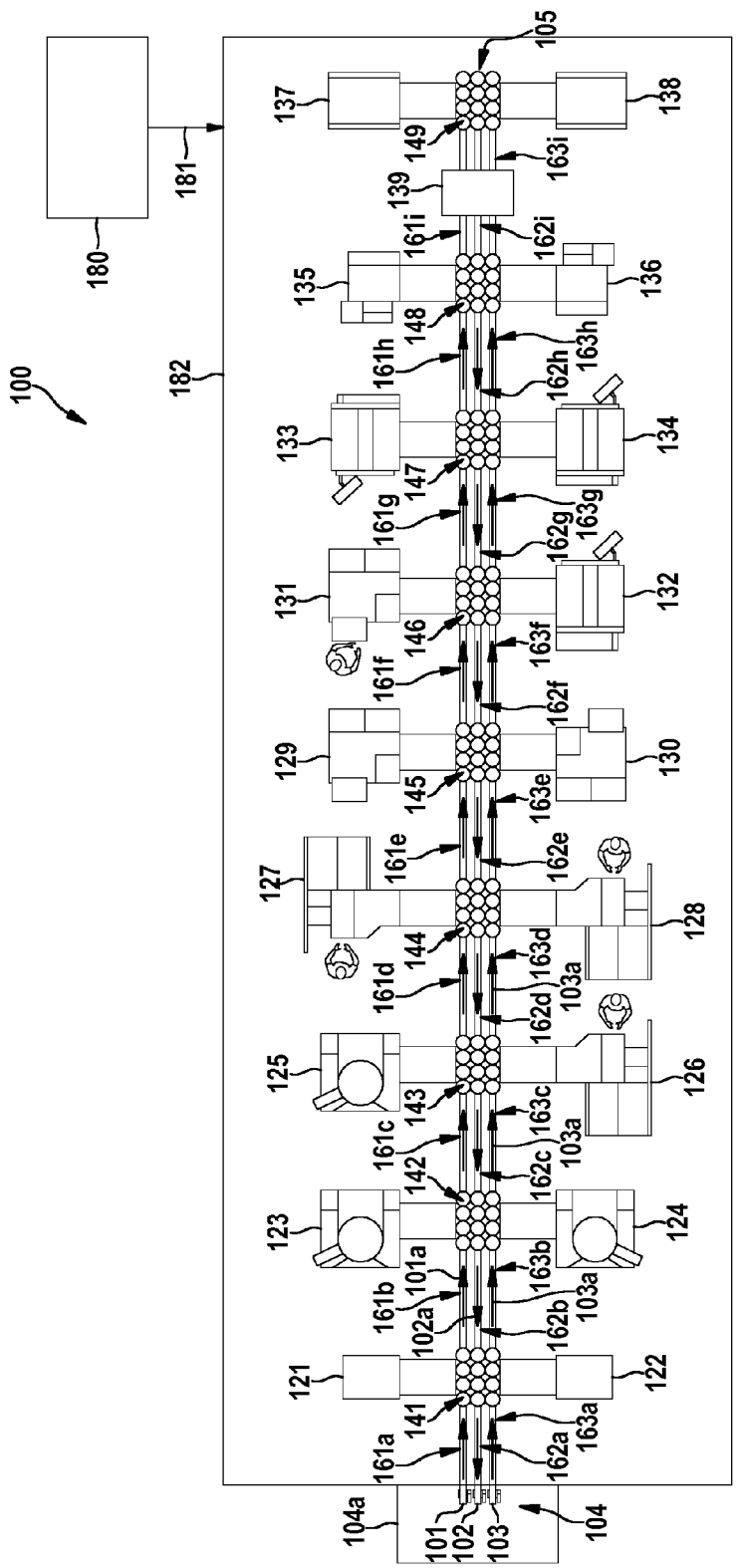
FIG. 1 shows a plan view from above of the first exemplary embodiment of a production system with a plurality of transfer devices according to the disclosure.

FIG. 1 shows a first exemplary embodiment of a production system 100 for spectacle lenses from spectacle lens blanks, in a plan view from above.

The production system comprises three transport tracks 101, 102, 103 for transporting spectacle lens blanks in transport containers and a plurality of process devices 121, 122, ... 137, 138. The three transport tracks 101, 102, 103 are arranged next to one another. In order to be able to distinguish the three transport tracks 101, 102, 103, these are denoted outer left transport track 101, outer right transport track 103 and central transport track 102. Each of these transport tracks 101, 102, 103 is provided to transport the transport containers equipped with the spectacle lens blanks in a respective transport direction 101a, 102a, 103a. These transport tracks 101, 102, 103 serve to transport the spectacle lens blanks to the respective process devices 121, 122, ... 137, 138, in which the spectacle lens blanks are processed until they are finished blanks or completely finished. Accordingly, together the three transport tracks 101, 102, 103 form a transport apparatus for transporting a spectacle lens blank by means of a transport container from a receiving point 104, by way of which the spectacle lens blank is received in the transport container, via the transport track, where there is a transfer to the respective process device 121, 122, ... 137, 138 and back to the transport track, and up to an output point 105, at which the processed spectacle lens blank can be removed in the finished or semifinished state.

A plurality of process devices 121, 123, 125, 127, 129, 131, 133, 135, 137 is arranged next to the outer left transport track 101. Likewise, a plurality of process devices 122, 124, 126, 128, 130, 132, 134, 136, 138 for the spectacle lens blanks is arranged next to the outer right transport track 103. The process device 121 is a blocker device for blocking the spectacle lens blanks. The process device 122 is a measuring device for measuring the surface contour of the blocked area of the spectacle lens blank. The process devices 123, 124 and 125 are milling devices. The process devices 126, 127, 128 are machining turning devices. The process devices 129, 130, 131 are conditioning devices. The process devices 132, 133, 134 are pre-polishing devices and the process devices 135, 136 are post-polishing devices. The process device 137 is a marking device and the process device 138 is a quality control device. A further process device 139, which spans all three transport tracks 101, 102, 103, is a cleaning device 140.

It is possible to gather from FIG. 1 that the transport direction 101a of the outer left transport track 101 and the transport direction 103a of the outer right transport track 103 are identical. By contrast, the transport direction 102a of the central transport track 102 is counter to the transport directions 101a, 103a of the outer left transport track 101 and the outer right transport track 103. Transport direction should be understood to mean the movement direction of the respectively transported spectacle lens blank along the respective transport tracks 101, 102, 103 in each case. This does not preclude a transfer of spectacle lens blanks occurring or being able to occur at the transfer points, described below, between the transport tracks 101, 102, 103. The spectacle lens blanks are transported with the aid of the transport container during the respective transport proceeding from the receptacle 104. The spectacle lens blanks, e.g., the semifinished products, are usually placed in pairs in this transport container. In this context, in pairs means that the spectacle lens blanks stored in a transport container are destined for the two spectacle lenses of spectacles of a user.

It is possible to gather from FIG. 1 that two process devices, which are arranged opposite one another in relation to the transport apparatus, respectively form of a process device pair in each case. Thus, the process devices 121 and 122 form a process device pair. Further, the process devices 123 and 124 form a process device pair. The process devices 125 and 126 also form a process device pair, etc.

A transfer device 141, 142, 143, . . . 146, 147, 148, 149 according to the disclosure is assigned to each process device pair 121, 122; 123, 124; 125, 126; . . . 135, 136; 137, 138. These transfer devices 141, 142, 143, . . . 146, 147, 148, 149 according to the disclosure serve to transfer the spectacle lens blanks between the respective left process device 121, 123, 125, 127, 129, 131, 133, 135, 137, 139 of the process device pair 121, 122; 123, 124; 125, 126; . . . 135, 136; 137, 138 and the outer left transport track 101 and the central transport track 102. Further, the transfer devices 141, 142, 143, . . . 146, 147, 148, 149 serve to transfer the spectacle lens blanks between the respective right process device 122, 124, 126, 128, 130, 132, 134, 136, 138 of the process device pair 121, 122; 123, 124; 125, 126; . . . 135, 136; 137, 138 and the outer right transport track 103 and the central transport track 102. Accordingly, a spectacle lens blank can be supplied by way of the respective outer transport track 101, 103 to the respectively adjacent process device (e.g., the process device 127) for value-adding processing. The central transport track 102 serves to transport the spectacle lens blank back to a preceding process device in the value-adding chain (e.g., to the process device 126 or to the process device 125 or to the process device 121 proceeding from the process device 127, etc.) in order to undertake post-processing or a renewed check, for example.

In addition to the transfer devices 141, 142, 143, . . . 146, 147, 148, 149 according to the disclosure that span all transport tracks 101, 102, 103, each transport track 101, 102, 103 comprises a plurality of transport devices 161a, 162a, 163a, 161b, 162b, 163b . . . 161h, 162h, 163h, 161i, 162i, 163i, which are embodied as double belt conveyors. The transport devices 161a, 161b, 161c, . . . 161h, 161i; 163a, 163b, 163c, . . . 163h, 163i of the two outer transport tracks 101, 103 serve to convey the spectacle lens blanks in the value-adding direction. Conveying is only carried out in the value-adding direction. The transport devices 162a, 162b, 162c, . . . 162h, 162i of the central transport track 102 serve to convey the spectacle lens blanks counter to the value-adding direction. Conveying on the central transport track 102 is only implemented counter to the value-adding direction.

Figure 2:
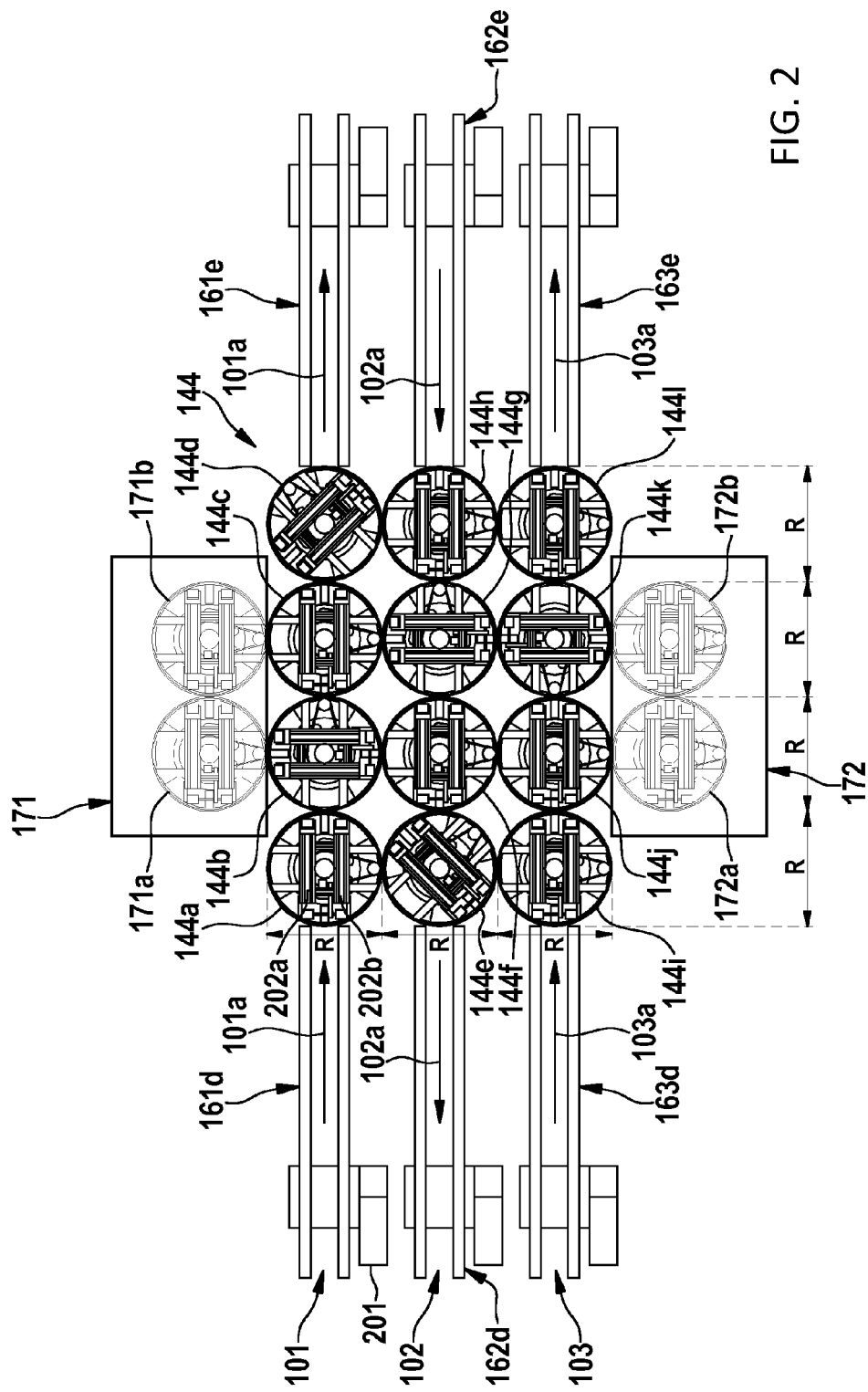
FIG. 2 shows a section relating to the conveying technology of the production system according to FIG. 1, including, in exemplary fashion, a transfer device according to the disclosure.

The transport devices 161a, 161b, . . . 161i, 162a, 162b, . . . 162i, 163a, 163b, . . . 163i and the transfer devices 141, 142, 143, . . . 146, 147, 148, 149 have an identical embodiment. FIG. 2 shows a section of FIG. 1, where six transport devices 161d, 161e, 162d, 162e, 163d, 163e of the transfer device 144 according to the disclosure, comprising two supply/intermediate storage modules 171, 172 for the process devices 127, 128, can be seen.

Figure 4:
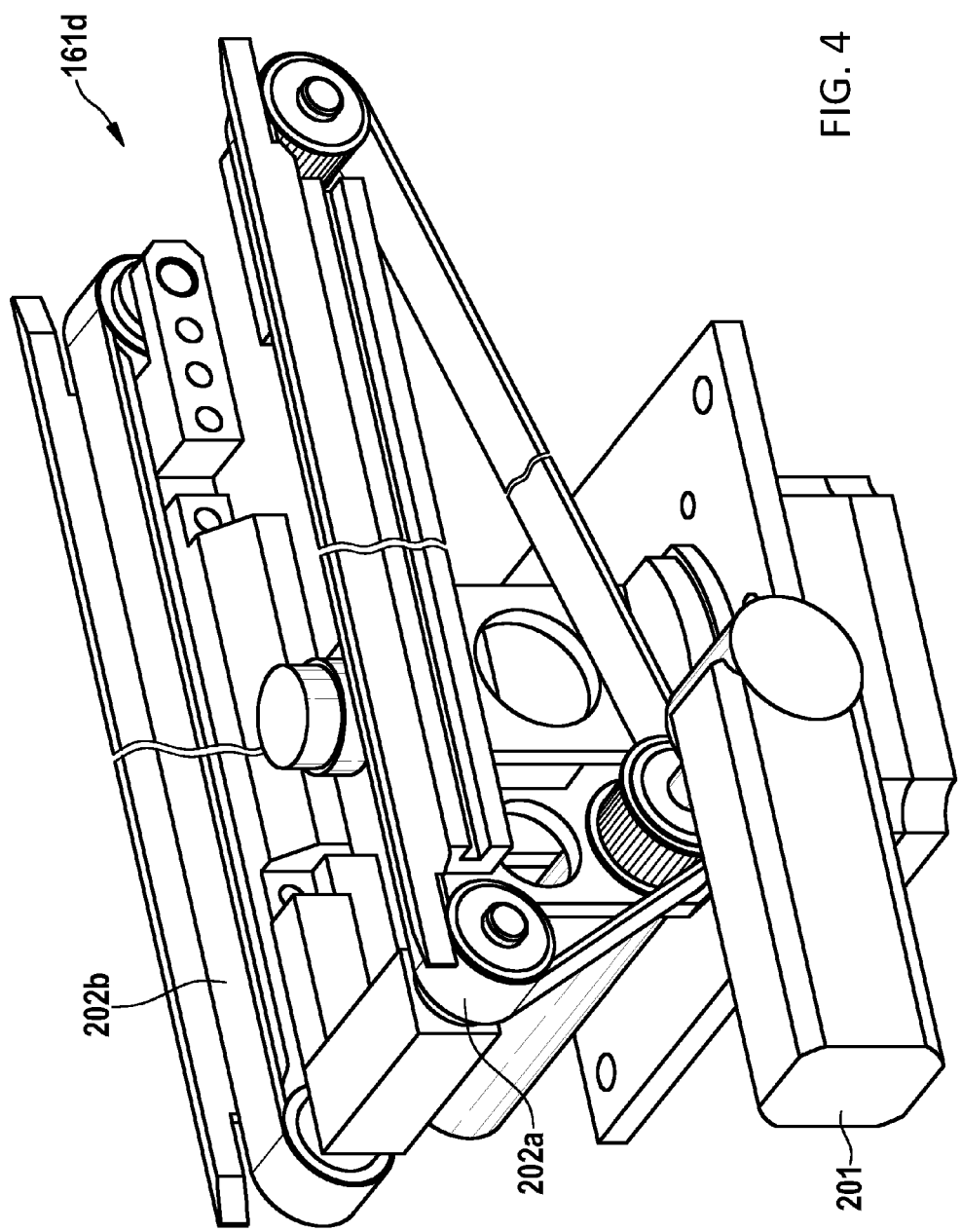
FIG. 4 shows a perspective view of a transport device.

FIG. 4 shows the transport device 161d in exemplary fashion. This transport device 161d comprises a motor-type drive 201 and two belts 202a, 202b, which are driven by the motor-type drive 201. The two belts 202a, 202b serve as a bearing for the above-described transport container for the spectacle lens blanks.

The shown exemplary embodiment of a transfer device 144 according to the disclosure comprises the twelve rotation/transport devices 144a, 144b, 144c, . . . 144i, 144j 144k, 144l. Here, the four rotation/transport devices 144a, 144b, 144c, 144d of the transfer device 144 belong to the outer left transport track 101, the four rotation/transport devices 144e, 144f, 144g, 144h belong to the central transport track 102 and the four rotation/transport devices 144i, 144j, 144k, 144l belong to the outer right transport track 103. Consequently, they form a 3×4 matrix.

Two further rotation/transport devices 171a, 171b; 172a, 172b are in each case arranged on both sides of the 3×4 matrix of the transfer device 144. These rotation/transport devices 171a, 171b; 172a, 172b form the two supply/intermediate storage modules 171, 172, which predominantly serve to temporarily store and supply the spectacle lens blank to the respective process device 127, 128. In principle, they are constituents of the transfer device 144.

Figure 5:
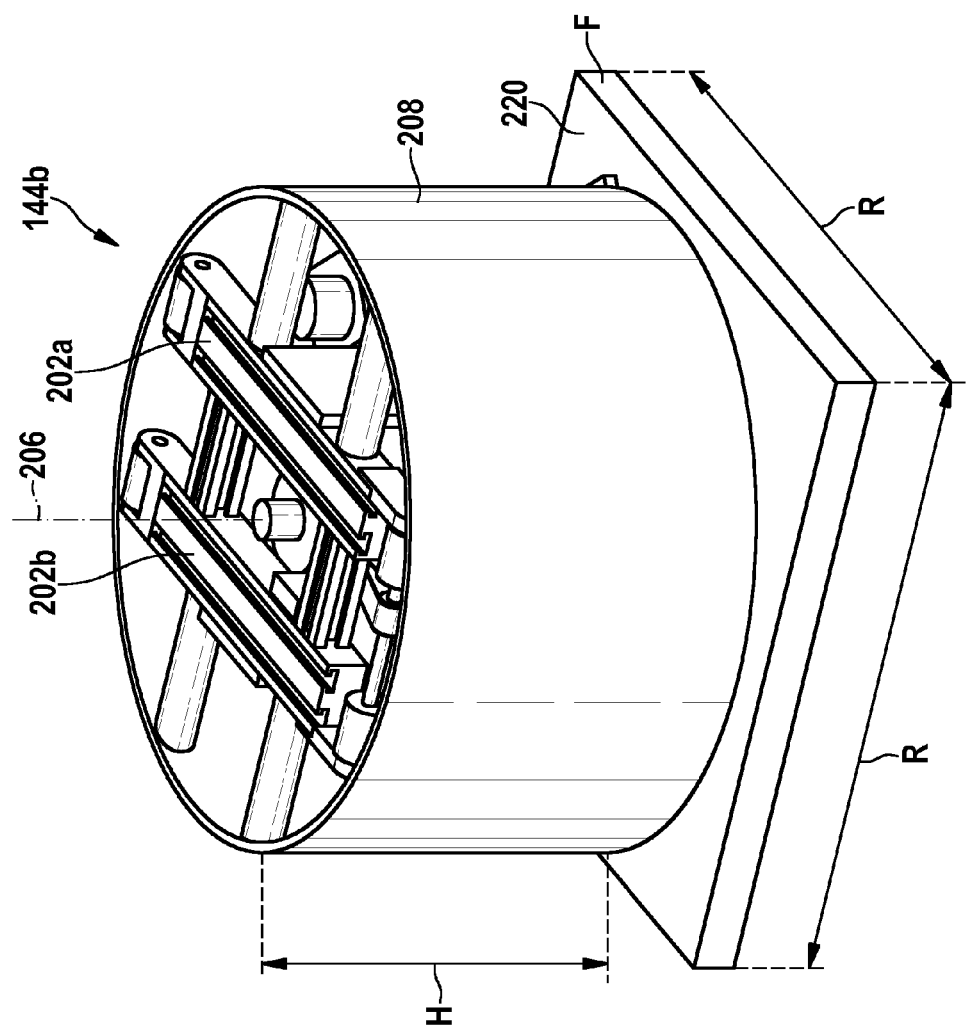
FIG. 5 shows a perspective view of a rotation/transport device of the transfer devices shown in FIGS. 1 to 3.
Figure 6:
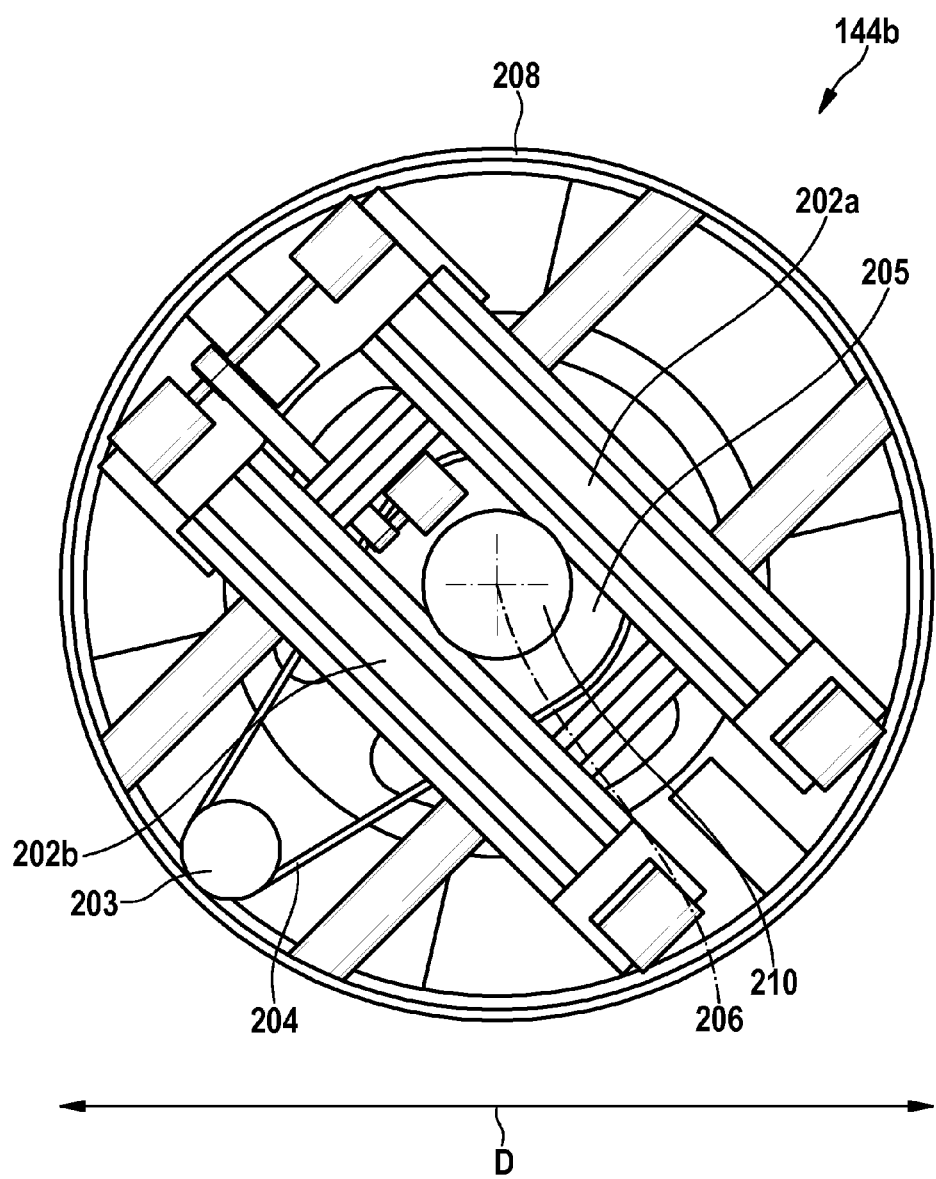
FIG. 6 shows a plan view of the rotation/transport device according to FIG. 5.

All rotation/transport devices 144a, 144b, 144c, . . . 144i, 144j 144k, 144l; 171a, 171b; 172a, 172b have an identical embodiment. FIG. 5 shows a perspective illustration of the rotation/transport device 144b in exemplary fashion. FIG. 6 shows the same rotation/transport device 144b in a plan view from above. As a matter of principle, the rotation/transport device 144b comprises a transport device of the type shown in FIG. 4, with a motor-type drive 201 in a miniaturized embodiment and two belts 202a, 202b. Moreover, the rotation/transport device 144b has a rotation drive with a motor-type drive 203, which can drive a wheel 205 by way of a belt 204 in a rotatory manner about a vertical axis 206 and which can thus change the transport direction of the two belts 202a, 202b. The rotation/transport device 144b firstly facilitates the transport of the transport container along the transport track 101 and secondly, after an appropriate rotation, facilitates the transport of the transport container to the adjacent central transport track 102 or to the adjacent process device 127. Specifically, a transfer or handover of the transport container may take place, proceeding between the rotation/transport device 144b and the rotation/transport devices 144a, 144c, 144e, 144f, 144g, 171a, 171b. To this end, it is necessary for the rotation/transport device 144b to be able to be rotated in 45° steps.

A computing device 180 is present in order to provide a high degree of flexibility. The computing device 180 is configured to calculate the fastest transport path for transporting a transport container with spectacle lens blanks to a predetermined process device (e.g., the process device 127). Further, the computing device 180 is configured to calculate the shortest transport path for transporting a predetermined spectacle lens blank of the spectacle lens blanks to a predetermined process device (e.g., the process device 127) of the process devices 121, 122; 123, 124; 125, 126; . . . 135, 136; 137, 138. Finally, an algorithm is saved in the computing device 180, the algorithm taking account of predetermined right-of-way rules when calculating the fastest or shortest transport path. A control device 182 that is likewise present and, e.g., connected to the computing device 180 by way of a wireless link 181 ensures in particular, e.g., by way of an appropriate actuation of the transport devices 161a, 161b, . . . 161i, 162a, 162b, . . . 162i, 163a, 163b, . . . 163i and the rotation/transport devices 144a, 144b, 144c, . . . 144i, 144j 144k, 144l; 171a, 171b; 172a, 172b that the transport container with the spectacle lens blanks is transported on the calculated transport path.

The transport speed of the transport devices 161a, 161b, . . . 161i, 162a, 162b, . . . 162i, 163a, 163b, . . . 163i and of the rotation/transport devices 144a, 144b, 144c, . . . 144i, 144j 144k, 144l; 171a, 171b; 172a, 172b is greater than 10 m/min and can be variably regulated in the exemplary embodiment. Each rotation/transport device 144a, 144b, 144c, . . . 144i, 144j 144k, 144l; 171a, 171b; 172a, 172b has a detection device in the form of an RFID reader station 210, typically integrated to the point of rotation 206. Consequently, different transport containers, and hence different orders, can be tracked at all times and at all places in real time. The alignment in which the transport containers are transported is also irrelevant; i.e., it need no longer be ensured that the transport containers have a defined alignment with respect to the transport unit, specifically the belts 202a, 202b, for example. Further, the position of the right/left spectacle lens blank in respect of the transport direction is irrelevant.

The upwardly pointing area of the rotation/transported devices 144a, 144b, 144c, . . . 144i, 144j 144k, 144l; 171a, 171b; 172a, 172b, which is predetermined by the grid dimension R×R, is covered by no more than 50% in the plan view in order to facilitate use in a ISO Class 5 cleanroom. Consequently, a laminar airflow with speed output of 0.3 (0.2-0.4 m/s) can flow through at the product plane. The transport containers overcome the distance to the next process device 127, 128 by means of advantageous double belt conveyors 202a, 202b.

The logic (movement, intermediate storage/parking, stopping for evasion or right-of-way rule) is handled on the in fact central transport track 102, in particular the rotation/transport devices 144e, 144f, 144g, 144h of the 3×4+(2×2) matrix formed by the rotation/transport devices 144a, 144b, 144c, . . . 144i, 144j 144k, 144l; 171a, 171b; 172a, 172b. The control device 182 of the production system 100 adopts the basic rules that are predetermined by the computing device 180, e.g., the PCS system by Quantum. A precondition lies in the continuous comparison of information. Each order can always be localized at the actual position in real time. The decisions in respect of the optimal transport path are made on the computing device level, to be precise "step-by-step" (n, n+1, n+2 etc.).

The respective two (or possibly more) rotation/transport devices 171a, 171b; 172a, 172b that form the supply/intermediate storage modules 171, 172 and that are arranged outside of the mass flow directly or indirectly serve the process devices 161a, 161b, . . . 161i, 162a, 162b, . . . 162i, 163a, 163b, . . . 163i (e.g., a polishing machine). This is regularly implemented by means of a 6-axis robot and double-swivel grippers, e.g., with vacuum suckers.

In principle, the production system 100 is scalable in X and Y. In addition to the above-described transport tracks 101, 102 and 103, the production system 100 may have one (or possibly more) left central transport track 101Z for transporting the spectacle lens blanks in a transport direction, arranged between the outer left transport track 101 and the central transport track 102. The production system may also have one (or possibly more) right central transport track(s) 103Z for transporting the spectacle lens blanks in a transport direction, arranged between the outer right transport track 103 and the central transport track 102, as is shown, for example, by FIG. 3 in sections.

Figure 3:
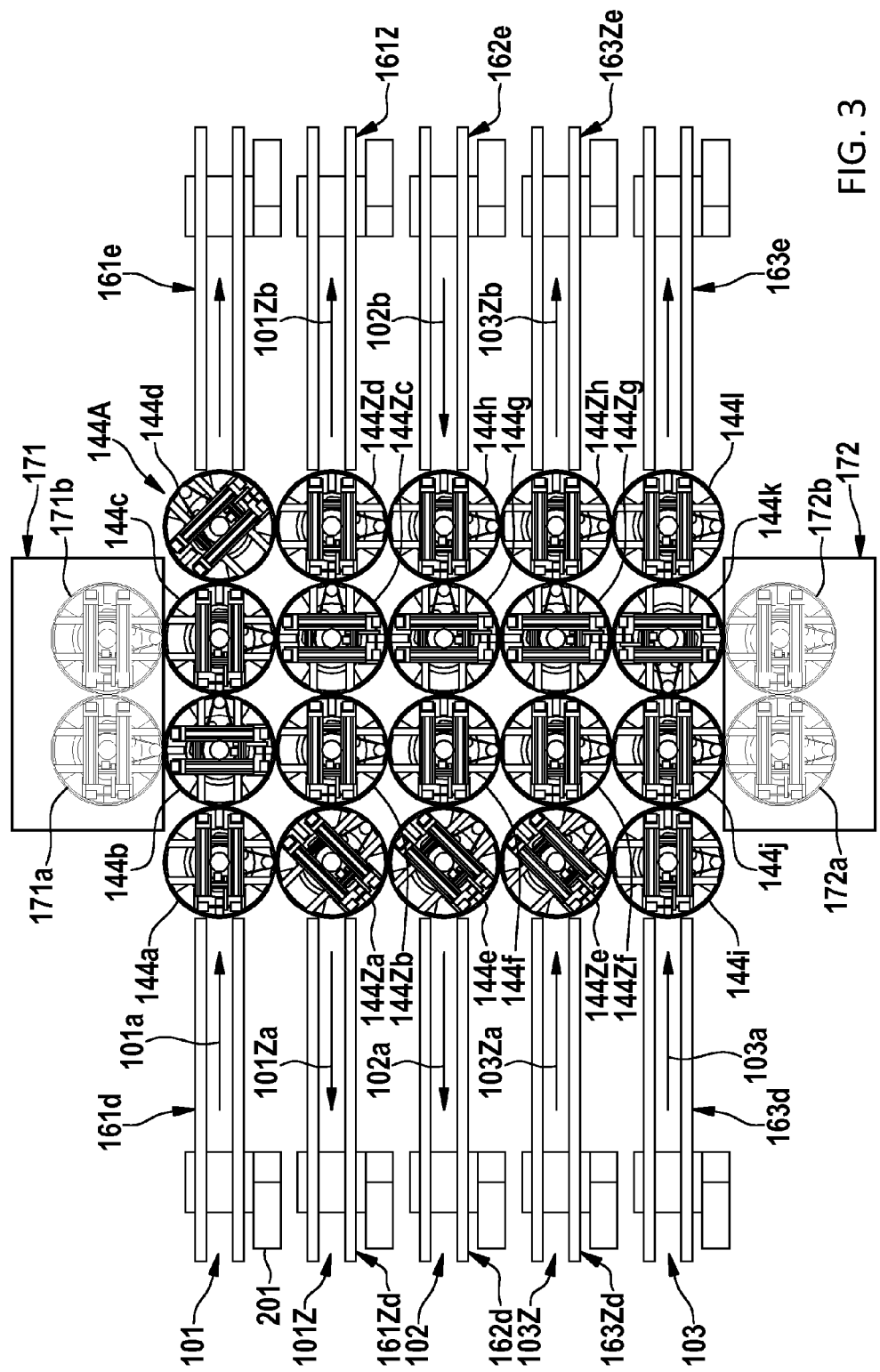
FIG. 3 shows a section from another production system with an alternative exemplary embodiment to the transfer device shown in FIG. 2.

These transport tracks 101Z, 103Z present in addition to the transport tracks 101, 102, 103 can serve for transportation in the direction of the value-adding chain, for returning and/or for temporarily storing transport containers with the spectacle lens blanks. FIG. 3 shows four of the transport devices 161Zd, 161Ze, 163Zd, 163Ze, which are constituent parts of the additional transport tracks 101Z, 103Z and which are present in addition to the transport devices 161a, 161b, . . . 161i, 162a, 162b, . . . 162i, 163a, 163b, . . . 163i.

The left central transport track 101Z comprises four left central rotation/transport devices 144Za, 144Zb, 144Zc, 144Zd. The right central transport track 103Z comprises four right central rotation/transport devices 144Ze, 144Zf, 144Zg, 144Zh. The rotation/transport devices 144a, 144b, 144c, . . . 144i, 144j 144k, 144l and 144Za, 144Zb, 144Zc, 144Zd and 144Ze, 144Zf, 144Zg, 144Zh, assigned to the transport tracks 101, 101Z, 102, 103Z, 103, and the rotation/transport devices 171a, 171b; 172a, 172b of the supply/intermediate storage modules 171, 172 are arranged in the style of a 5×4+(2×2) matrix, forming a transfer device 144A.

In the exemplary embodiments described above and shown in FIGS. 2 to 6, the rotation/transport devices 144a, 144b, 144c, . . . 144i, 144j 144k, 144l and 144Za, 144Zb, 144Zc, 144Zd, 171a, 171b; 172a, 172b have a height in respect to the base area of between 800 mm and 1200 mm, the conventional height being 950 mm. The module installation height H is approximately 200 mm (see FIG. 5). The rotation/transport devices 144a, 144b, 144c, . . . 144i, 144j 144k, 144l and 144Za, 144Zb, 144Zc, 144Zd, 171a, 171b; 172a, 172b are arranged in a grid R of 300 mm (see FIGS. 2 and 5). That is to say, the rotation/transport devices 144a, 144b, 144c, . . . 144i, 144j 144k, 144l and 144Za, 144Zb, 144Zc, 144Zd and 171a, 171b; 172a, 172b have an external diameter D of 298 mm (see FIG. 6). Since the individual rotation/transport devices 144a, 144b, 144c, . . . 144i, 144j 144k, 144l and 144Za, 144Zb, 144Zc, 144Zd and 171a, 171b; 172a, 172b have a closed outer ring 208 (see FIGS. 5 and 6), no pinching and shearing point arises, and consequently the respective entire matrix, which forms a transfer device 144 or 144A, can make do without housing and safety devices such as light barriers, for example.

A basic frame, on which both the rotation/transport devices 144a, 144b, 144c, . . . 144i, 144j 144k, 144l and 144Za, 144Zb, 144Zc, 144Zd, 171a, 171b; 172a, 172b and the transport devices 161a, 161b, . . . 161i, 162a, 162b, . . . 162i, 163a, 163b, . . . 163i, 161Zd, 161Ze, 163Zd, 163Ze are assembled, is situated in the lower region. The media routing of pressurized air, power supply (also for the process devices 121, 122; 123, 124; 125, 126; . . . 135, 136; 137, 138), process media, e.g., polishing means, and the like is all integrated at a level of between 200 mm and 600 mm with respect to the base area.

All rotation/transport devices (individual matrix modules) 144a, 144b, 144c, . . . 144i, 144j 144k, 144l and 144Za, 144Zb, 144Zc, 144Zd and 171a, 171b; 172a, 172b have plug-in connections for a mechanical system, power supply, pneumatic system, sensor system/controller (SPS) etc., such that these can be quickly interchanged and put back into operation. This ensures short interruptions.

The inventors have recognized that is it advantageous not to modify the transport directions 101a, 103a of the outer transport tracks 101, 103 and, instead, leave these in the direction of increasing added value. Specifically, the inventors propose that the transport direction 101a of the outer left transport track 101 is non-reversible and that the transport direction 103a of the outer right transport track 103 is non-reversible. The transport direction 102 of the central transport track 102 can also have a non-reversible embodiment. In this context, non-reversible means during standard operation, in particular during the entire process cycle in relation to the processing of a spectacle lens blank to form the finished spectacle lens or to form the spectacle lens blank no longer to be processed in the production system 100. The term non-reversible does not relate to servicing or test operation, but only to the standard production process. If the transport direction is reversible, this does not necessarily mean that the transport direction is reversed over the entire transport track. Rather, the transport direction can also be reversed within individual sections, in particular on one or more transport devices and/or on one or more rotation/transport devices.

In the exemplary embodiment shown in FIG. 3, the respective transport direction 101Za, 102a, 102b of the transport devices 161Zd, 162d, 162e is counter to the value-adding direction and, in particular, counter to the respective transport direction 101a, 101Zb, 103Za, 103Zb, 103a of the remaining transport devices 161d, 161e, 161Ze, 163Zd, 163Ze, 163d, 163e. This reversed transport direction 161Zd, 162d, 162e is primarily implemented on account of the necessity of post-processing or for the purposes of the return transport of empty transport containers.

The operating method for the entire production system 100—naturally also in any development and, in particular, in the exemplary embodiment sketched out in FIG. 3 and described above—is computer-implemented and realized by way of an appropriate computer program with program code, which is situated on the computer, specifically represented, in particular, by the computing device 180 and the control device 182, and which is realized by the processes thereof.

It comprises the control of the transfer of the transport containers between the above-described transport tracks 101, 101Z, 102, 103Z, 103 and the supply to and removal from the respective process device 121, 122; 123, 124; 125, 126; . . . 135, 136; 137, 138.

The computer program also comprises control commands for driving the transport devices 161a, 161b, . . . 161i, 162a, 162b, . . . 162i, 163a, 163b, . . . 163i, 161Zd, 161Ze, 163Zd, 163Ze, in particular the double conveyor belts. It further comprises the control commands for the transport drive (e.g., double conveyor belts) and the rotational drive (e.g., a stepper motor) of the above-described rotation/transport devices 144a, 144b, 144c, . . . 144i, 144j 144k, 144l and 144Za, 144Zb, 144Zc, 144Zd and 171a, 171b; 172a, 172b.

The computer program has an algorithm that serves to calculate the above-described shortest or quickest transport path. The logistics rules are calculated by algorithm in such a way that the transport devices 161a, 161b, . . . 161i, 162a, 162b, . . . 162i, 163a, 163b, . . . 163i, 161Zd, 161Ze, 163Zd, 163Ze and the rotation/transport devices 144a, 144b, 144c, . . . 144i, 144j 144k, 144l and 144Za, 144Zb, 144Zc, 144Zd operate in self-regulating and autonomous fashion and even settle on the respective admissible production state WIP (work in production) of the respective spectacle lens blank. Rules such as "fastest path to the next station" or "shortest path" or "loaded goods have right-of-way" are predetermined. Special algorithms are used for the search for the best path, the algorithms considering the respective next states of the transport devices 161a, 161b, . . . 161i, 162a, 162b, . . . 162i, 163a, 163b, . . . 163i, 161Zd, 161Ze, 163Zd, 163Ze and the rotation/transport devices 144a, 144b, 144c, . . . 144i, 144j 144k, 144l and 144Za, 144Zb, 144Zc, 144Zd and 171a, 171b; 172a, 172b and predetermining the next path for the transport containers by way of an algorithmic calculation. Here, the rotation/transport devices 144a, 144b, 144c, . . . 144i, 144j 144k, 144l and 144Za, 144Zb, 144Zc, 144Zd and 171a, 171b; 172a, 172b also exploit the option of the flexible, diagonal path, which is decided by means of the algorithmic calculation.

Here, an integer number n of transport containers may be situated on a rotation/transport device 144a, 144b, 144c, . . . 144i, 144j 144k, 144l and 144Za, 144Zb, 144Zc, 144Zd and 171a, 171b; 172a, 172b. The bearing surface for the transport containers on a rotation/transport device 144a, 144b, 144c, . . . 144i, 144j 144k, 144l and 144Za, 144Zb, 144Zc, 144Zd and 171a, 171b; 172a, 172b, which is set by the belts 202a, 202b in the present exemplary embodiment, is chosen in such a way that one or more transport containers have space.

By means of neural networks, the spectacle lens blanks are input in an ideal fashion by an end-side buffer 104a (see FIG. 1) and supplied to the receptacle point 104 (together with appropriate transport containers). Here, the states of the process devices 121, 122; 123, 124; 125, 126; . . . 135, 136; 137, 138, the states of the tools used in these process devices 121, 122; 123, 124; 125, 126; . . . 135, 136; 137, 138, pending servicing or else advantageous process device and order pairs are taken into account in each case. The orders are input to the manufacturing with the most advantageous order/process device combination in each case. The set WIP and Kanban signals present in this case represent a further influencing variable when inputting and also occupying the conveyor technology and load of the process devices 121, 122; 123, 124; 125, 126; . . . 135, 136; 137, 138.

On account of the algorithmic calculation carried out by the computing device 180, it is possible that defective rotation/transport devices 144a, 144b, 144c, . . . 144i, 144j 144k, 144l and 144Za, 144Zb, 144Zc, 144Zd and 171a, 171b; 172a, 172b and optionally also transport devices 161a, 161b, . . . 161i, 162a, 162b, . . . 162i, 163a, 163b, . . . 163i, 161Zd, 161Ze, 163Zd, 163Ze, identified by way of an appropriate sensor system or manually, are circumnavigated in automatic and self-regulating fashion as these are already masked during the search for the shortest or fastest path. For this purpose, the computing device 180 has an interface by way of which this information can be supplied.

After replacement of the defective module (rotation/transport devices 144a, 144b, 144c, . . . 144i, 144j 144k, 144l and 144Za, 144Zb, 144Zc, 144Zd and 171a, 171b; 172a, 172b or transport devices 161a, 161b, . . . 161i, 162a, 162b, . . . 162i, 163a, 163b, . . . 163i, 161Zd, 161Ze, 163Zd, 163Ze) or the defective modules, the production system 100 automatically uses these modules again. To this end, a state tag is used, which is set by, for example, a status reporting device 220, shown in FIG. 5, in the rotation/transport device 144b.

Orders can be revised by running production or post-processing orders, for example.

Transport containers can be removed from the production system 100 at any point, for example for manual interventions, but they can likewise also be reintroduced at any point. The production system 100 immediately identifies the ID code of the order with the aid of the RFID reader station 210 attached to the point of rotation 206 and independently adapts its regulation (without human intervention).

The orders are forwarded, inter alia, to the next station (transport device, rotation/transport device, process device, etc.) by means of Kanban signals. These Kanban signals are provided with timers which allow an order to be driven out of the process devices independently in the case of a fault in order to be forwarded to another free process device. All of this is carried out without human intervention and by a self-regulating system realized on the computer.

As a result of all of these prescriptions, it is possible in the production system 100 for the orders either to be in motion or be processed in one of the process devices and hence for the ideal WIP to be set and for a throughput speed of up to 1.2-times the sum of all process times to be possible.

The overall layout in the exemplary embodiment shown in FIG. 1 is linked in three circuits, with each being regulated in a so-called ConWIP (controlled work in production). Moreover, Kanban signals are only used within the circuits; this yields a hybrid control facilitating an ideal throughput/passage time.

An entirely straight-lined arrangement of the transport tracks as shown in FIG. 1 is the fastest variant; however, U/L forms and polygonal chains can be facilitated at all times. What is characteristic for the aforementioned layout formations is that the transport direction for loaded goods is always maintained and only empty goods, post-processing work or, optionally, rejects are transported in the opposite direction.

Figure 7A:
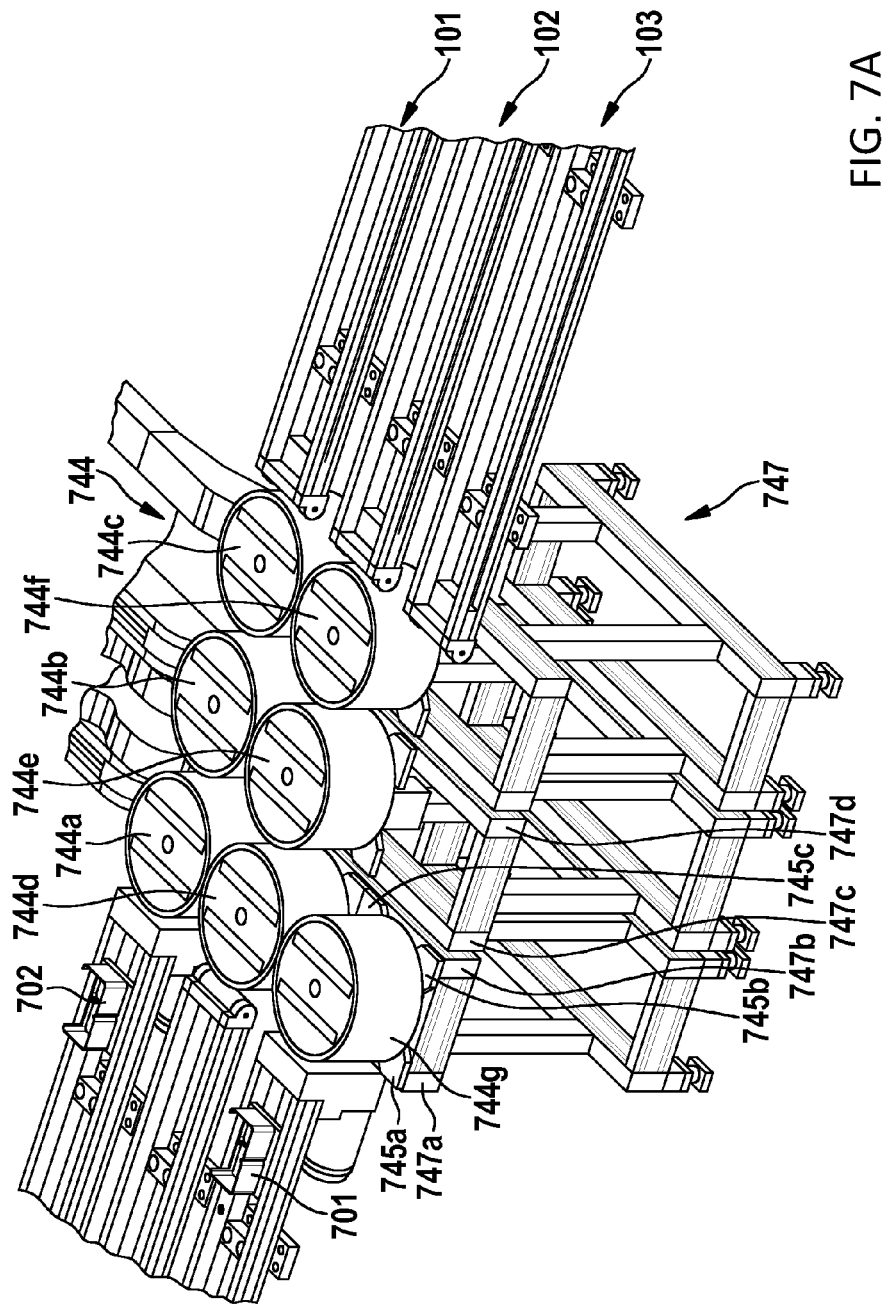
FIG. 7A shows a section of an assembly of a plurality of rotation/transport devices according to FIG. 5.
Figure 7B:
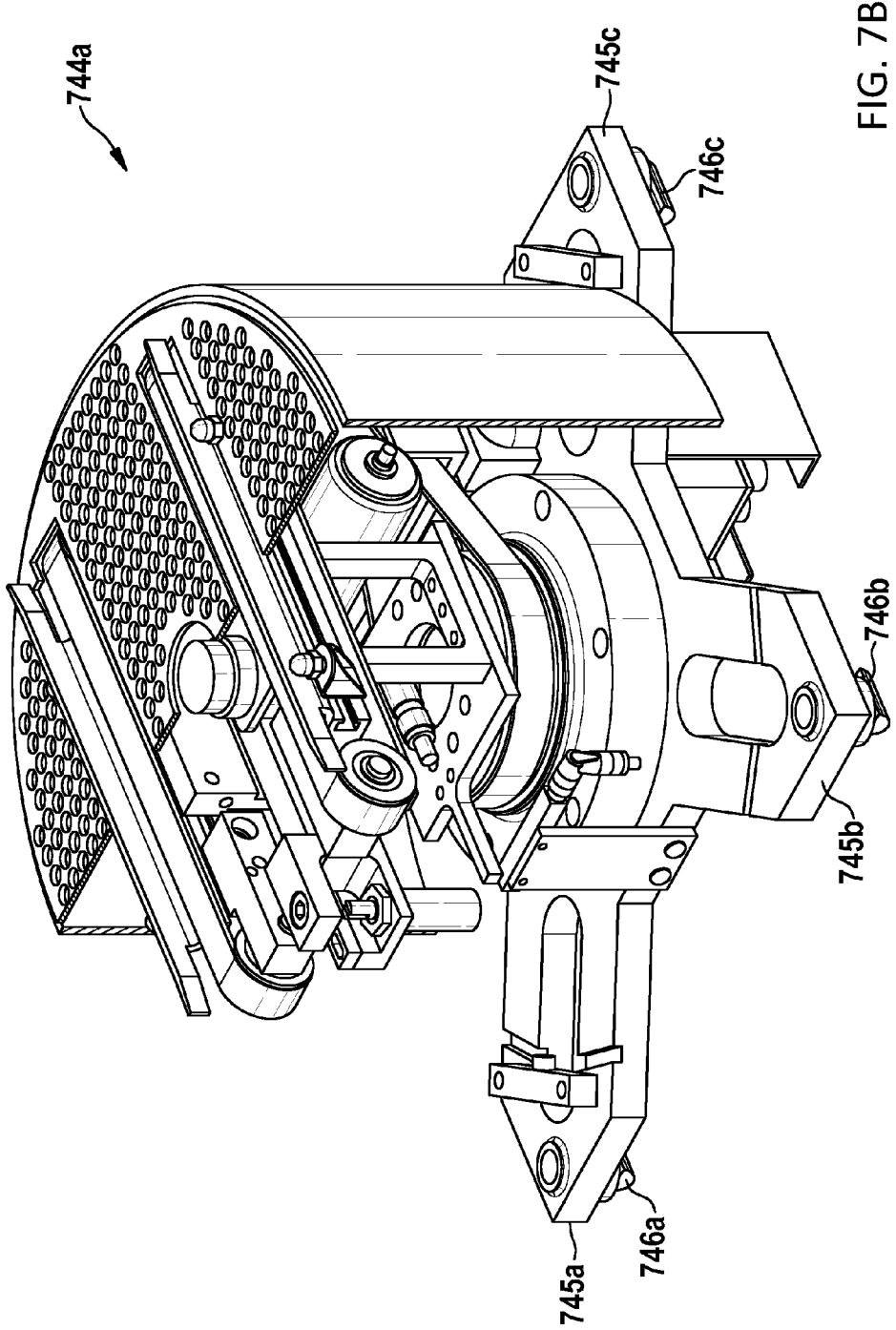
FIG. 7B shows a slice through the rotation/transport device according to FIG. 5.

Below, the modular design of a transfer device according to the disclosure is explained on the basis of FIGS. 7 *a*) and *b*). FIG. 7 *a*) shows a section of a production system of the type shown in FIG. 1. The production system comprises three transport tracks 101, 102, 103, arranged next to one another, for transporting spectacle lens blanks in transport containers 701, 702 and a transfer device 744 according to the disclosure with a plurality of rotation/transport devices 744*a*, 744*b*, 744*c*, 744*d*, 744*e*, 744*f*, 744*g* of the type shown in FIGS. 5 and 6. The rotation/transport devices 744*a*, 744*b*, 744*c*, 744*d*, 744*e*, 744*f*, 744*g* have coupling devices 745*a*, 745*b*, 745*c*, which are embodied in a manner complementary to bearing rails 747*a*, 747*b*, 747*c*, 747*d* of a frame 747 and which can be connected to one another with the aid of screw/nut connections 746*a*, 746*b*, 746*c*. Alternatively, it is also possible to attach coupling devices, which have a complementary embodiment to one another, laterally to the respective rotation/transport devices 744*a*, 744*b*, 744*c*, 744*d*, 744*e*, 744*f*, 744*g* and couple these directly with one another.

Figure 8:
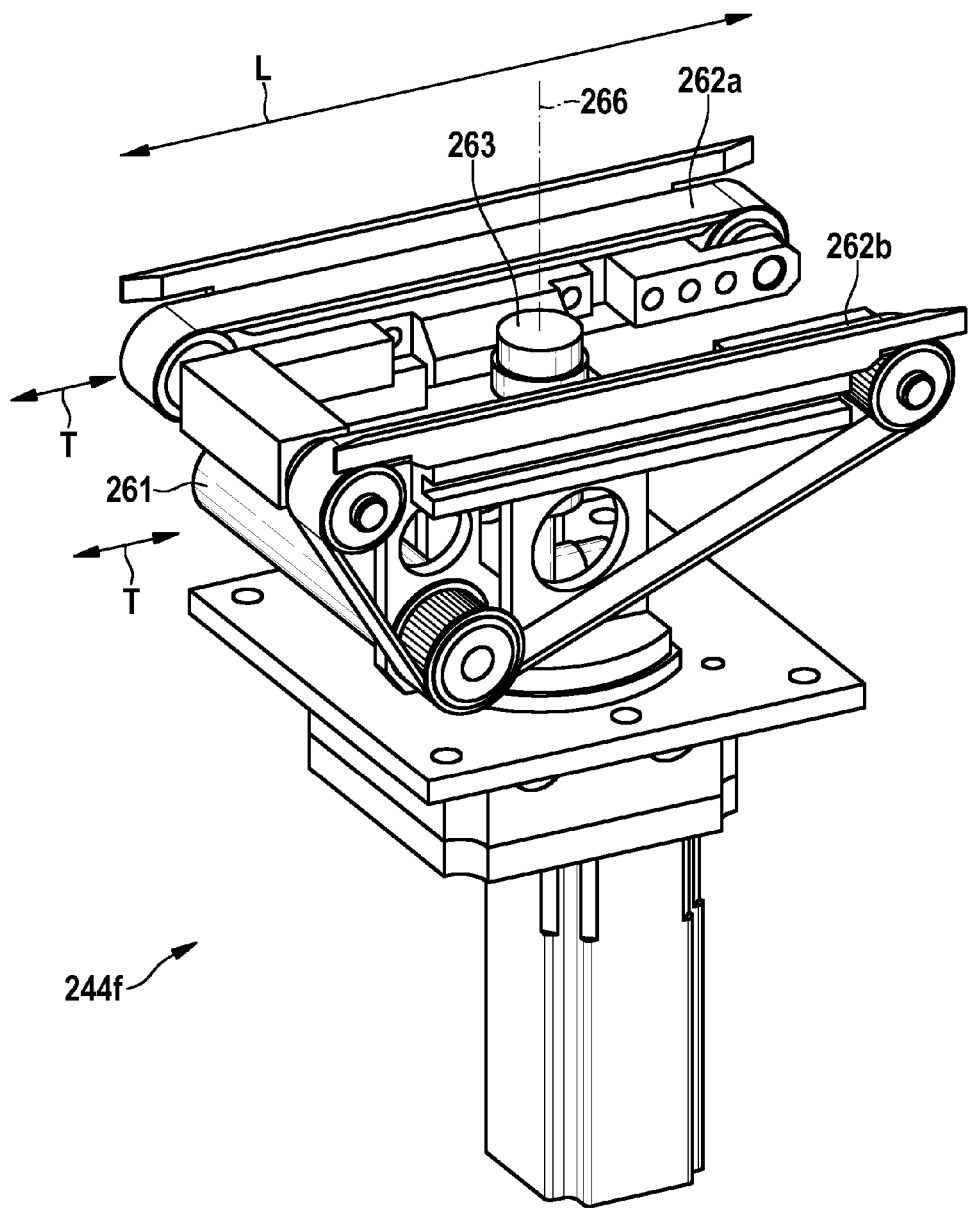
FIG. 8 shows a perspective view of an alternative exemplary embodiment of a rotation/transport device according to the disclosure.
Figure 9:
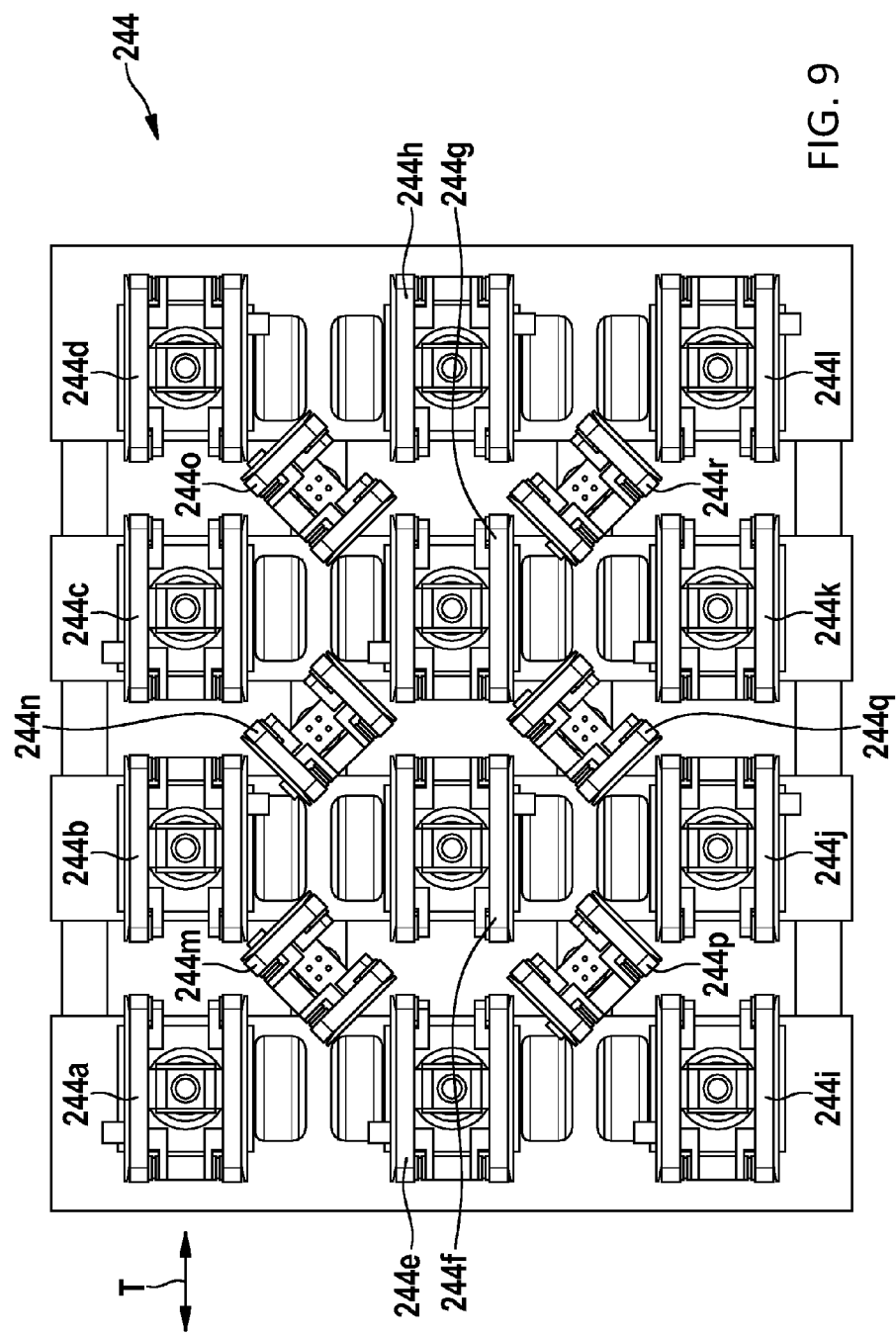
FIG. 9 shows a further alternative exemplary embodiment of a transfer device having a multiplicity of the rotation/transport devices shown in FIG. 7.

In a plan view from above, FIG. 9 shows a further alternative exemplary embodiment of a transfer device 244 with twelve identically embodied rotation/transport devices 244*a*, 244*b*, 244*c* . . . 244*l*, 244*j*, 244*k*, 244*l*, one of which, specifically the rotation/transport device 244*f*, is reproduced in an exemplary fashion in FIG. 8 in a perspective view, and also six further identically embodied rotation/transportation devices 244*m*, 244*n*, 244*o*, 244*p*, 244*q*, 244*r*.

The rotation/transport devices 244*a*, 244*b*, 244*c* . . . 244*l*, 244*j*, 244*k*, 244*l* are arranged in the form of a 3×4 matrix. The four rotation/transport devices 244*a*, 244*b*, 244*c*, 244*d* of the transfer device 244 belong to an outer left transport track, the four rotation/transport devices 244*e*, 244*f*, 244*g*, 244*h* belong to a central transport track and the four rotation/transport devices 244*i*, 244*j*, 244*k*, 244*l* belong to an outer right transport track. The rotation/transport devices 244*m*, 244*n*, 244*o*, 244*p*, 244*q*, 244*r* are likewise arranged in the form of a matrix, specifically a 2×3 matrix. The 2×3 matrix penetrates the 3×4 matrix or, expressed differently, the rotation/transport devices 244*m*, 244*n*, 244*o*, 244*p*, 244*q*, 244*r* are arranged at the corners of the cells of the 3×4 matrix, in which the rotation/transport devices 244*a*, 244*b*, 244*c* . . . 244*l*, 244*j*, 244*k*, 244*l* are situated. Conversely, the rotation/transport devices 244*a*, 244*b*, 244*c* . . . 244*l*, 244*j*, 244*k*, 244*l* are arranged at the corners of the cells of the 2×3 matrix, in which the rotation/transport devices 244*m*, 244*n*, 244*o*, 244*p*, 244*q*, 244*r* are situated, the rotation/transport devices 244*a*, 244*b*, 244*c* . . . 244*l*, 244*j*, 244*k*, 244*l*.

Just like the rotation/transport devices 244*a*, 244*b*, 244*c* . . . 244*i*, 244*j*, 244*k*, 244*l* of the same design, the rotation/transport device 244*f* comprises, as a matter of principle, a transport device with a motor-type drive 261 in a miniaturized embodiment and two belts 262*a*, 262*b*. Moreover, the rotation/transport device 244*f* has a rotation device with a motor-type drive 263, which can drive the transport device in a rotatory manner about a vertical axis 266 and which can thus change the transport direction T of the two belts 262*a*, 262*b*. The rotation/transport device 244*f* firstly facilitates the transport of a transport container along the transport direction T shown in FIG. 8 and secondly, after an appropriate rotation, facilitates the transport of the transport container to an adjacent transport track or to an adjacent process device.

In the exemplary embodiment, the rotation/transport devices 244*m*, 244*n*, 244*o*, 244*p*, 244*q*, 244*r* substantially have the same design as the rotation/transport devices 244*a*, 244*b*, 244*c* . . . 244*i*, 244*j*, 244*k*, 244*l*. The rotation/transport devices 244*m*, 244*n*, 244*o*, 244*p*, 244*q*, 244*r* only differ in terms of the installation length L. Similar to the rotation/transport devices 144*a*, 144*b*, 144*c*, . . . 144*i*, 144*j* 144*k*, 144*l* and 144Z*a*, 144Z*b*, 144Z*c*, 144Z*d*, 144Z*e*, 144Z*f*, 144Z*g*, 144Z*h* and 171*a*, 171*b*; 172*a*, 172*b*, the rotation/transport devices 244*a*, 244*b*, 244*c* . . . 244*i*, 244*j*, 244*k*, 244*l* and 244*m*, 244*n*, 244*o*, 244*p*, 244*q*, 244*r* are alignable in discrete 45° steps.

FIGS. 10 to 17 show fourth to eleventh exemplary embodiments of a transfer device according to the disclosure.

Figure 10:
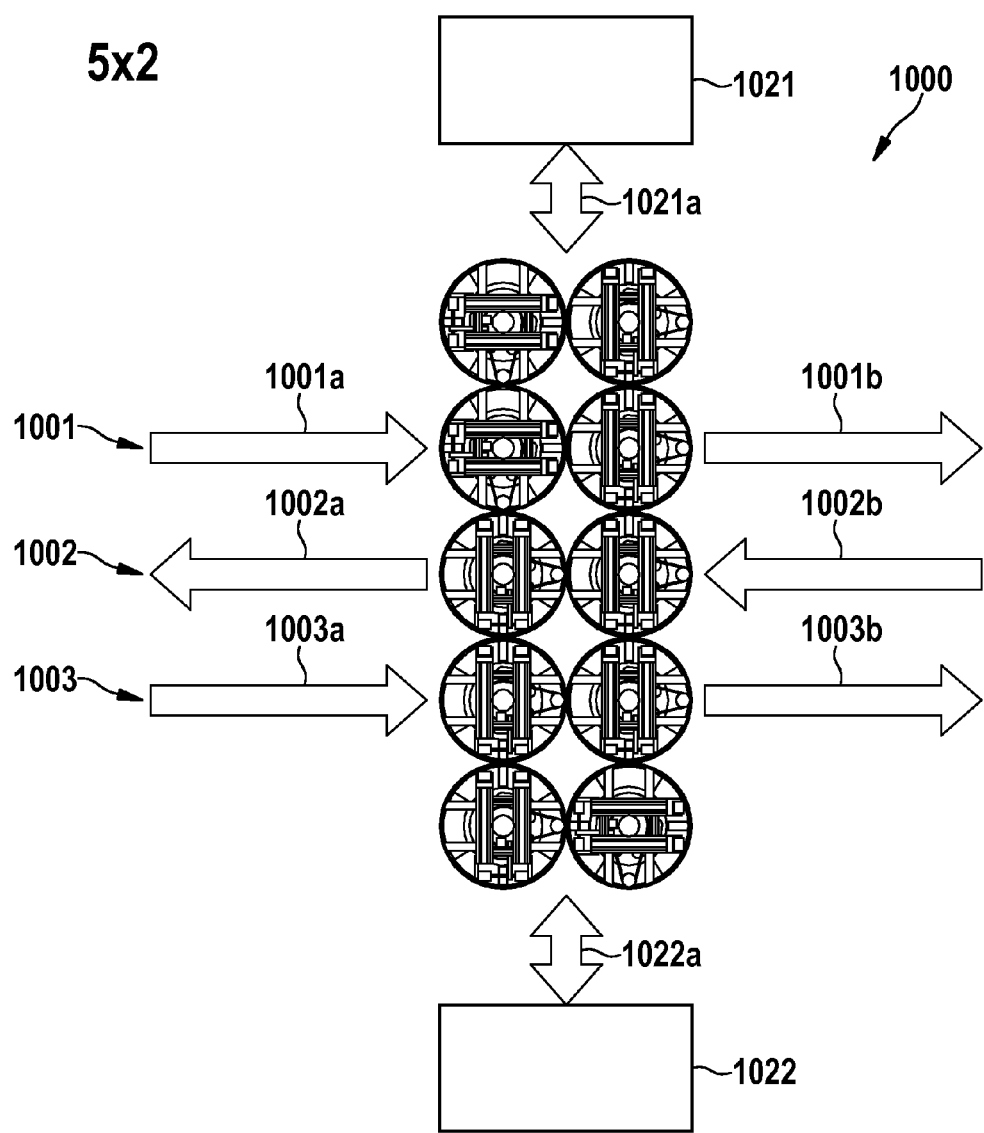
FIG. 10 shows a fourth exemplary embodiment of a transfer device.

FIG. 10 shows a transfer device 1000 in the form of a 5×2 matrix. The reference signs 1001, 1002, 1003 denote three transport tracks, the reference signs 1001*a*, 1001*b*, 1002*a*, 1002*b*, 1003*a* and 1003*b* show the transport directions of the transport devices defining the transport tracks 1001, 1002, 1003. The double-headed arrows with the reference signs 1021*a*, 1022*a* specify the transport directions to the process stations 1021, 1022.

Figure 11:
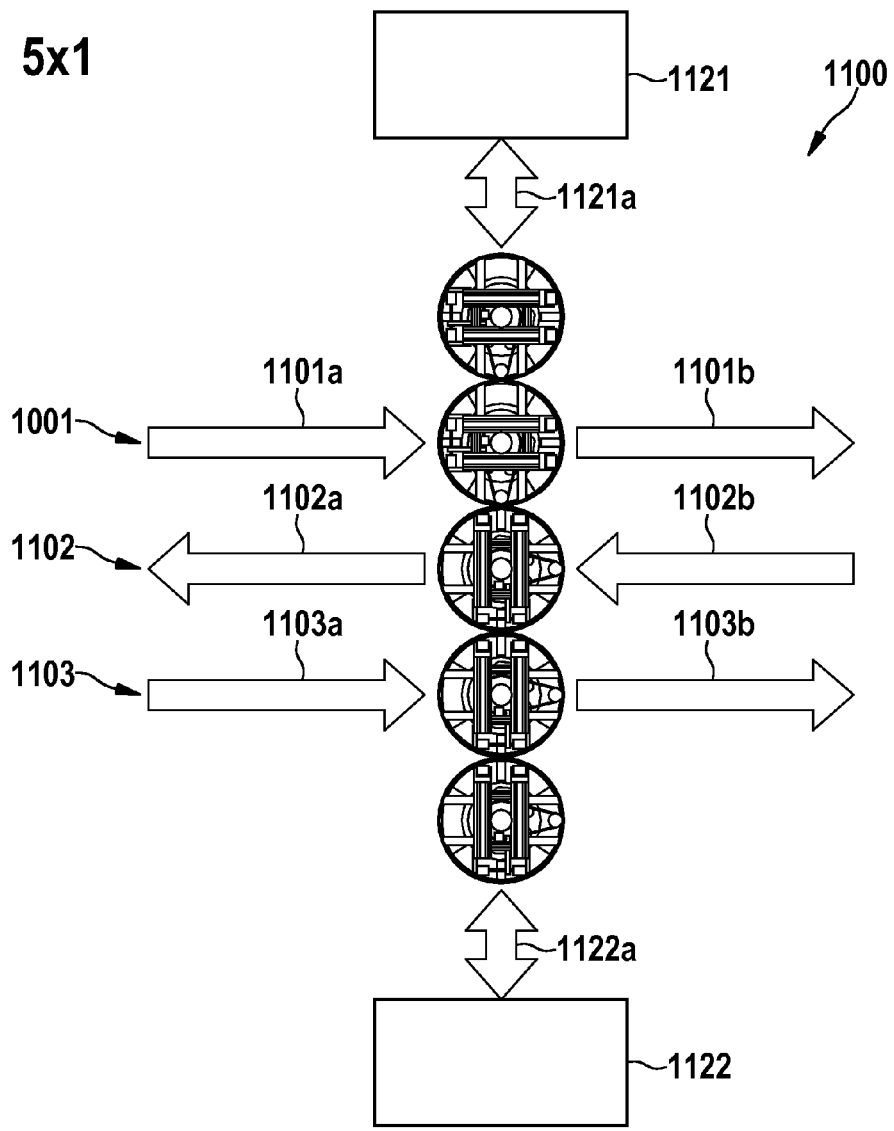
FIG. 11 shows a fifth exemplary embodiment of a transfer device.

FIG. 11 shows a transfer device 1100 in the form of a 5×1 matrix. The reference signs 1101, 1102, 1103 denote three transport tracks, the reference signs 1101*a*, 1101*b*, 1102*a*, 1102*b*, 1103*a* and 1103*b* show the transport directions of the transport devices defining the transport tracks 1101, 1102, 1103. The double-headed arrows with the reference signs 1121*a*, 1122*a* specify the transport directions to the process stations 1121, 1122.

Figure 12:
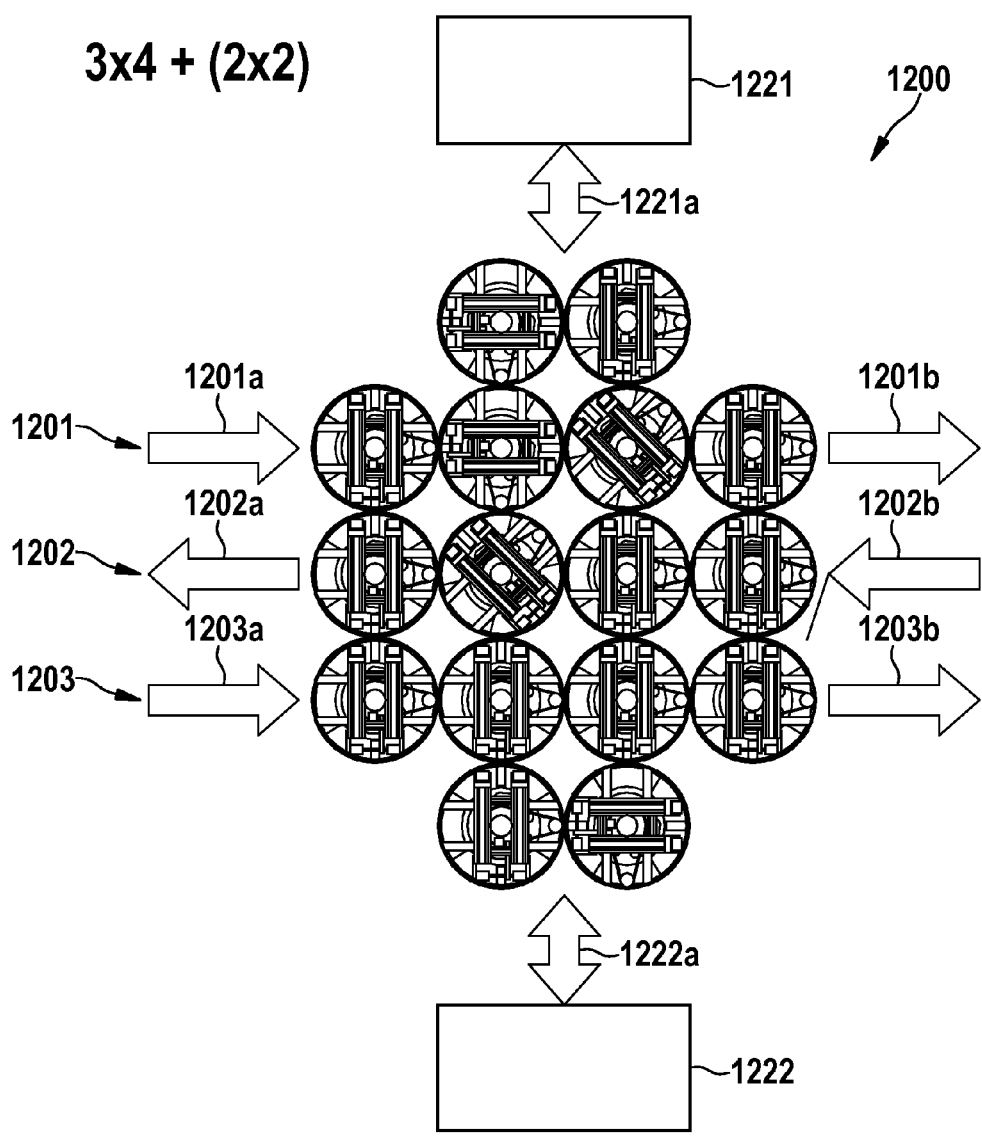
FIG. 12 shows a sixth exemplary embodiment of a transfer device.

FIG. 12 shows a transfer device 1200 in the form of a 3×4+(2×2) matrix. The reference signs 1201, 1202, 1203 denote three transport tracks, the reference signs 1201*a*, 1201*b*, 1202*a*, 1202*b*, 1203*a* and 1203*b* show the transport directions of the transport devices defining the transport tracks 1201, 1202, 1203. The double-headed arrows with the reference signs 1221*a*, 1222*a* specify the transport directions to the process stations 1221, 1222.

Figure 13:
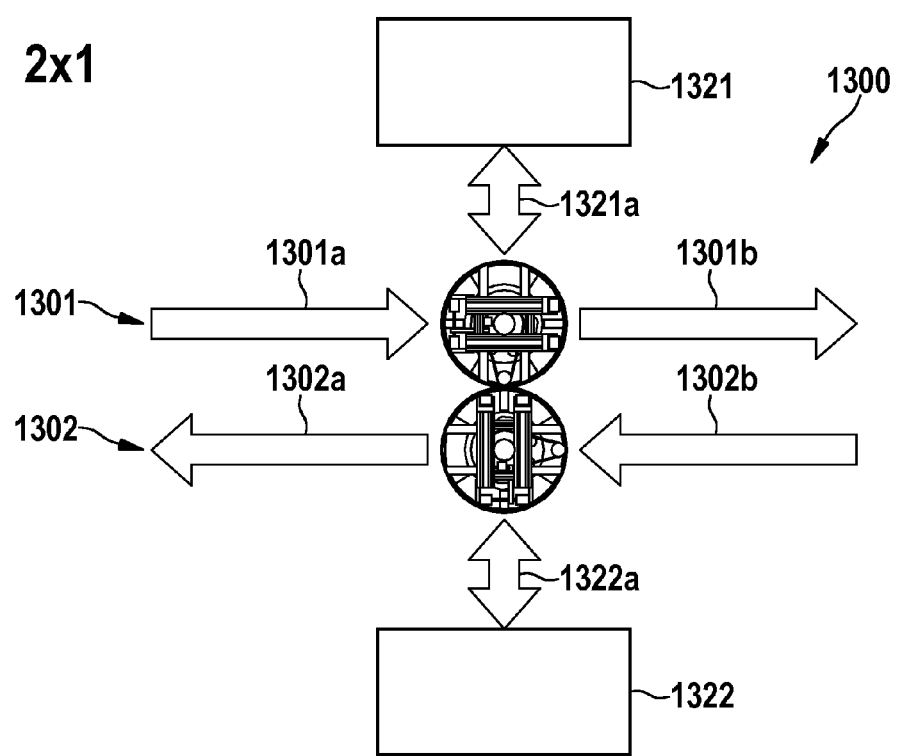
FIG. 13 shows a seventh exemplary embodiment of a transfer device.

FIG. 13 shows a transfer device 1300 in the form of a 2×1 matrix. The reference signs 1301, 1302 denote two transport tracks, the reference signs 1301a, 1301b, 1302a, 1302b show the transport directions of the transport devices defining the transport tracks 1301, 1302. The double-headed arrows with the reference signs 1321a, 1322a specify the transport directions to the process stations 1321, 1322.

Figure 14:
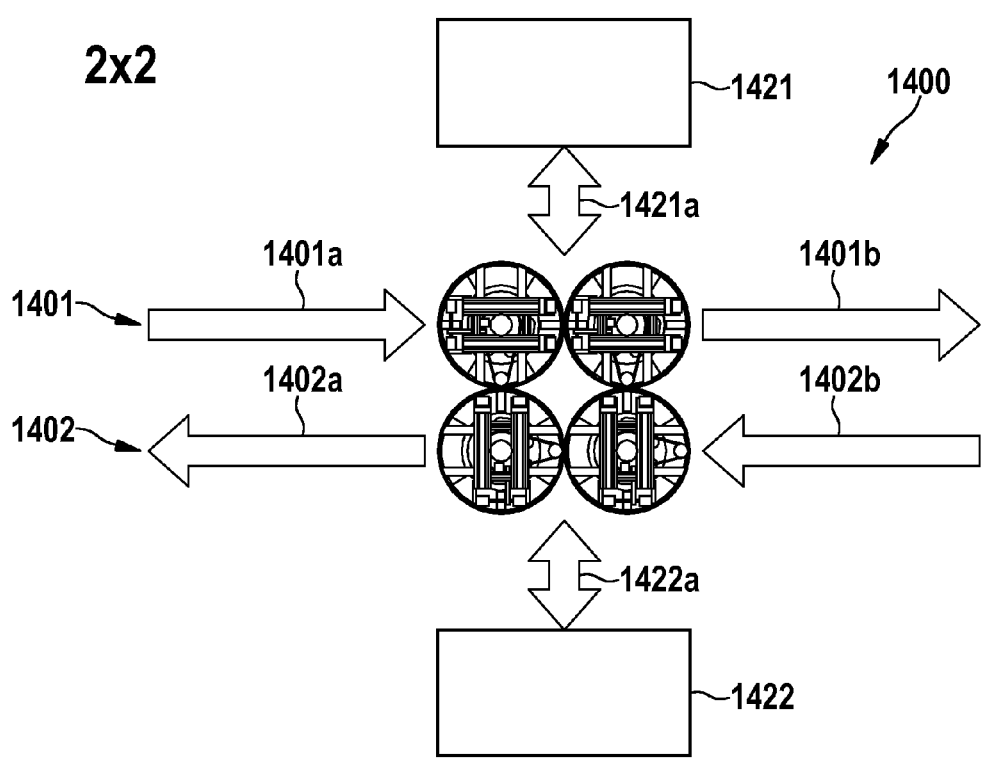
FIG. 14 shows an eighth exemplary embodiment of a transfer device.

FIG. 14 shows a transfer device 1400 in the form of a 2×1 matrix. The reference signs 1401, 1402 denote two transport tracks, the reference signs 1301a, 1301b, 1402a, 1402b show the transport directions of the transport devices defining the transport tracks 1401, 1402. The double-headed arrows with the reference signs 1421a, 1422a specify the transport directions to the process stations 1421, 1422.

Figure 15:
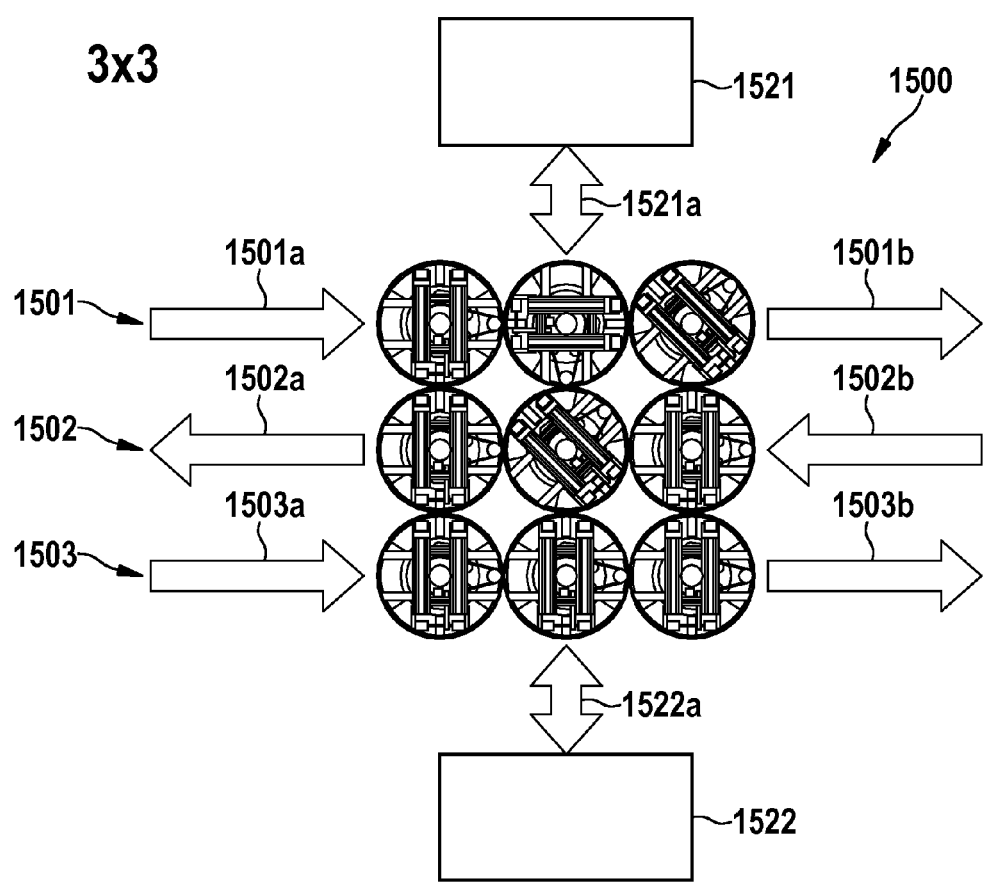
FIG. 15 shows a ninth exemplary embodiment of a transfer device.

FIG. 15 shows a transfer device 1500 in the form of a 3×3 matrix. The reference signs 1501, 1502, 1503 denote three transport tracks, the reference signs 1501a, 1501b, 1502a, 1502b, 1503a and 1503b show the transport directions of the transport devices defining the transport tracks 1501, 1502, 1503. The double-headed arrows with the reference signs 1521a, 1522a specify the transport directions to the process stations 1521, 1522.

Figure 16:
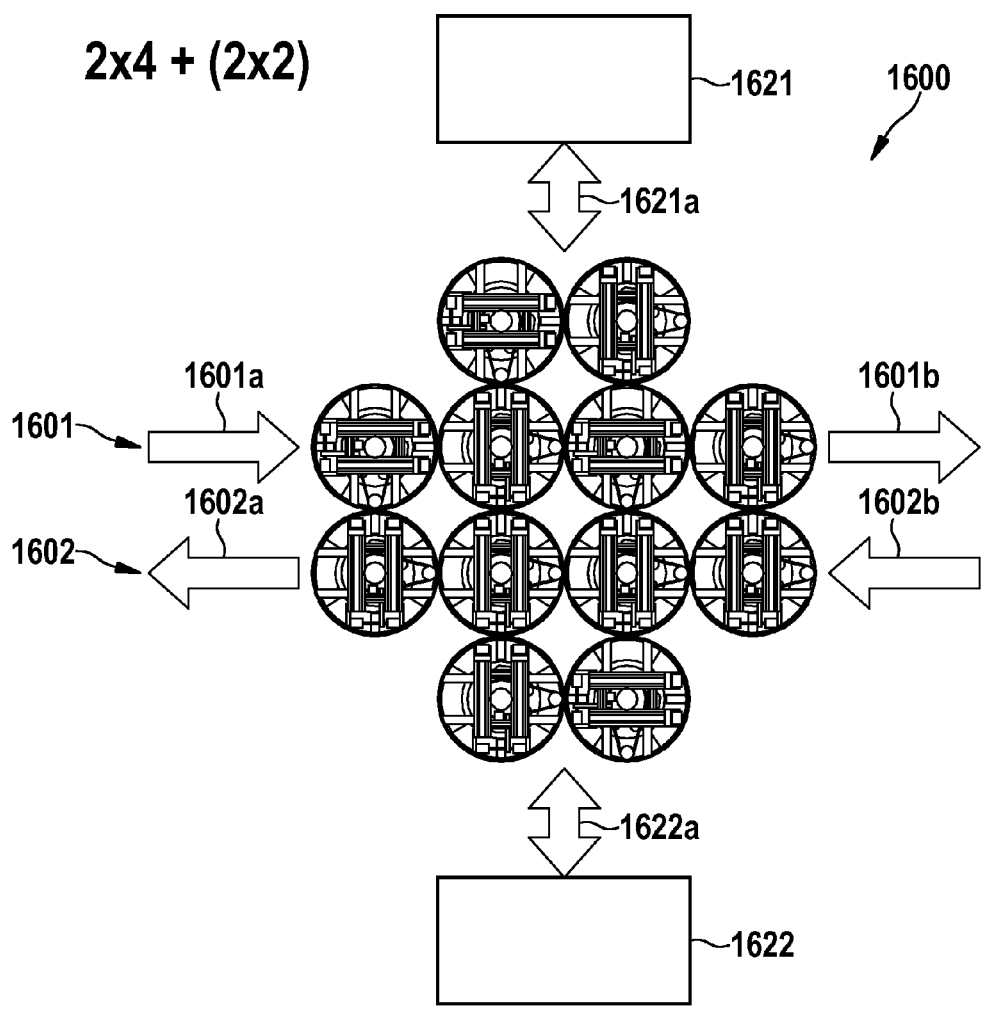
FIG. 16 shows a tenth exemplary embodiment of a transfer device.

FIG. 16 shows a transfer device 1600 in the form of a 2×4+(2×2) matrix. The reference signs 1601, 1602 denote two transport tracks, the reference signs 1601a, 1601b, 1602a, 1602b show the transport directions of the transport devices defining the transport tracks 1601, 1602. The double-headed arrows with the reference signs 1621a, 1622a specify the transport directions to the process stations 1621, 1622.

Figure 17:
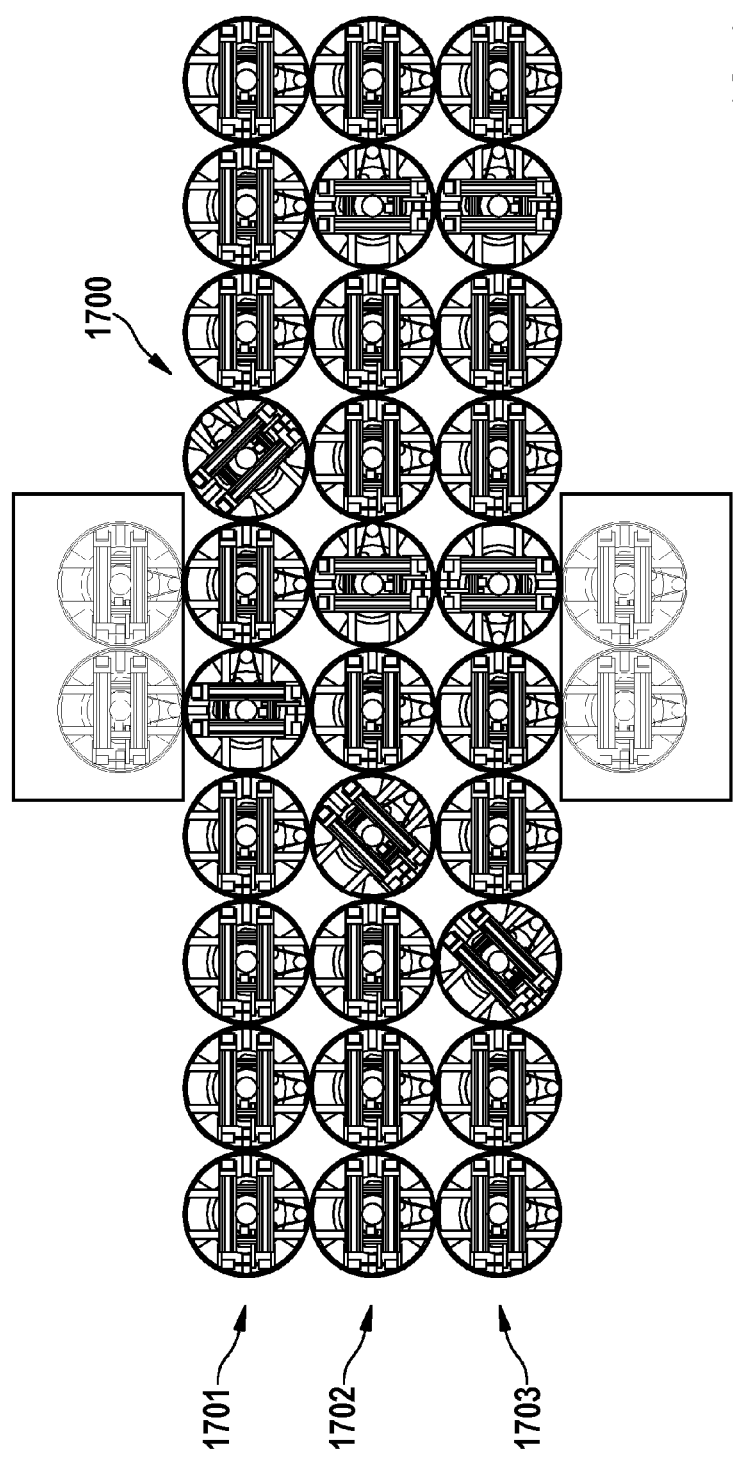
FIG. 17 shows an eleventh exemplary embodiment of a transfer device.

FIG. 17 shows a transfer device 1700 in the form of a 3×10+(2×2) matrix. The reference signs 1701, 1702, 1703 denote three transport tracks.

FIGS. 18 to 22 show different options for the transport container transportation on the basis of the transfer device 1000 according to FIG. 10 (see the reference signs there).

Figure 18:
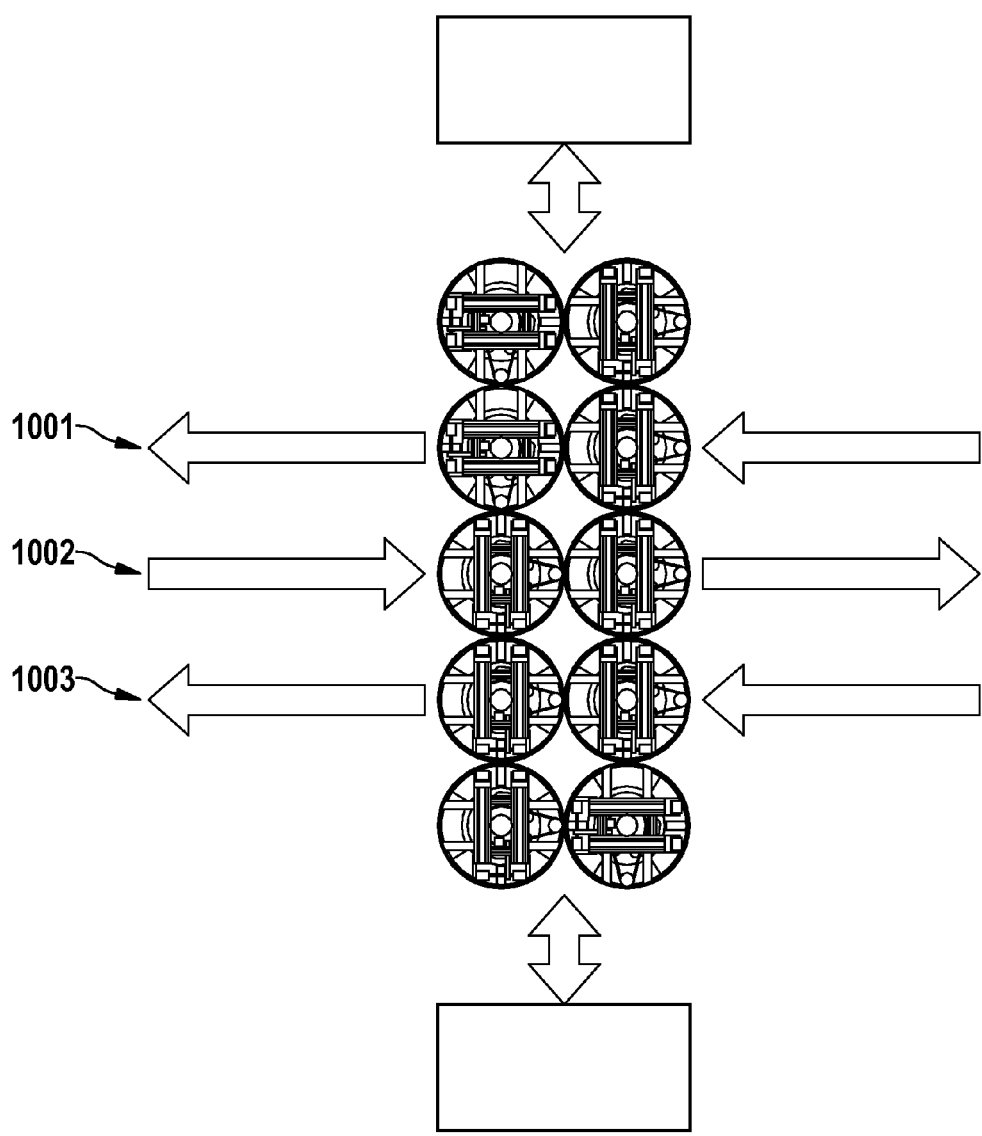
FIG. 18 shows a first option for transporting a transport container with the fifth exemplary embodiment of a transfer device according to FIG. 10.

FIG. 18 shows precisely the reverse mass flow to FIG. 10. The empty and/or post-processing transport is implemented by way of the outer transport tracks 1001, 1003, whereas value is added by way of the central transport track 1002.

Figure 19:
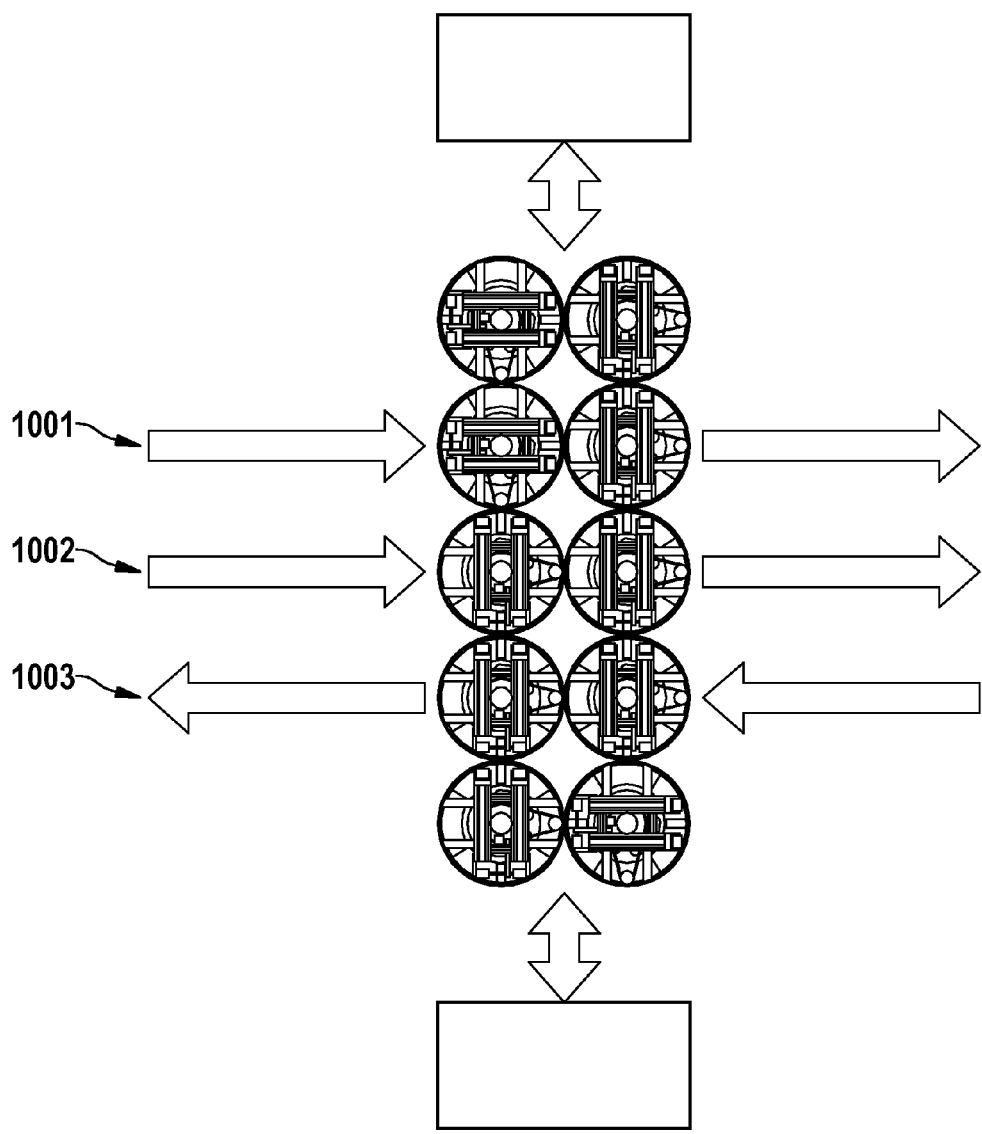
FIG. 19 shows a second option for transporting a transport container with the fifth exemplary embodiment of a transfer device according to FIG. 10.

In the transport directions shown in FIG. 19, value is added in the left and central transport track 1001, 1002. The right transport track 1003 is provided for the return transport of empty transport containers or for post-processing purposes.

Figure 20:
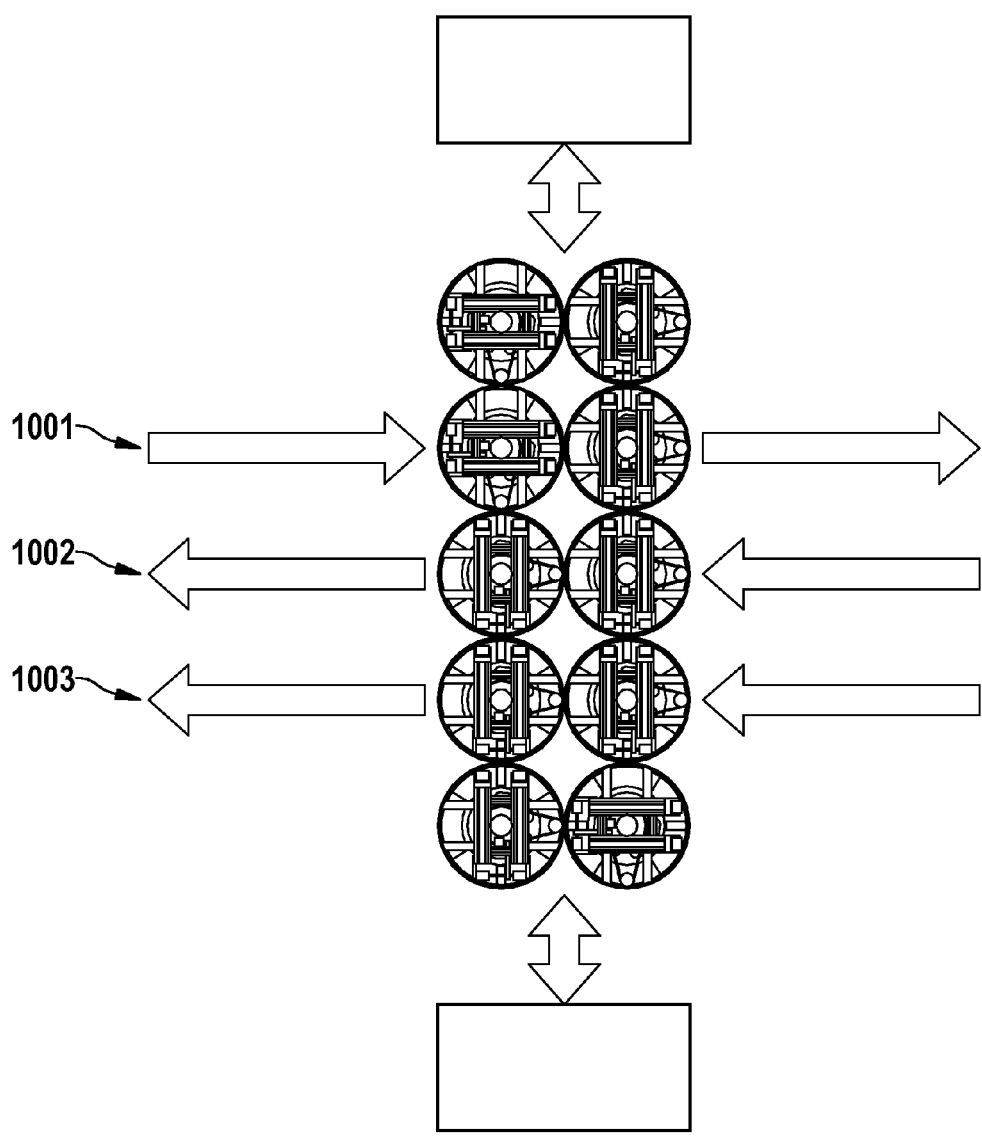
FIG. 20 shows a third option for transporting a transport container with the fifth exemplary embodiment of a transfer device according to FIG. 10.

FIG. 20 shows a configuration in which only the left transport track 1001 is provided for the value-adding transport while the central and right transport tracks 1002, 1003 are provided for the empty and post-processing transfer.

Figure 21:
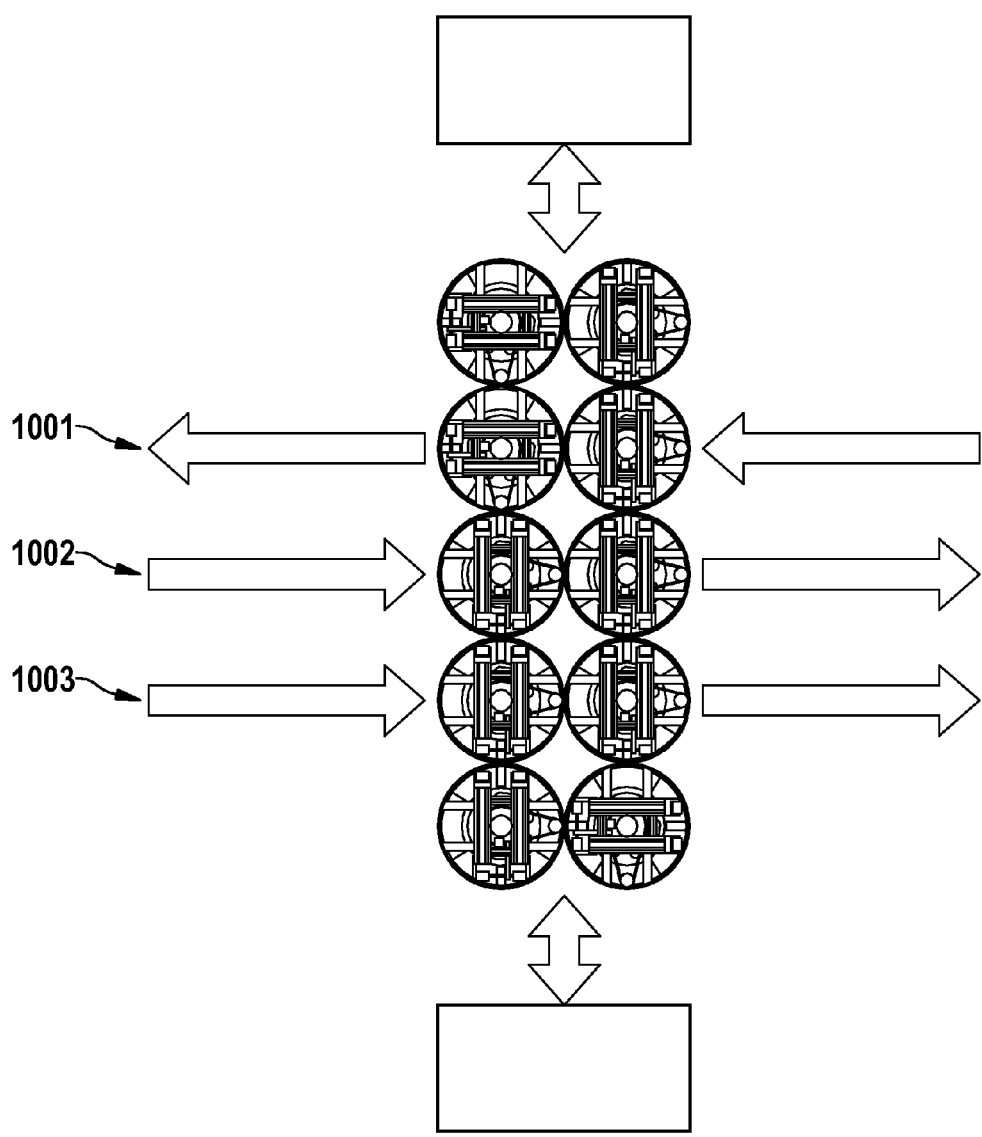
FIG. 21 shows a fourth option for transporting a transport container with the fifth exemplary embodiment of a transfer device according to FIG. 10.
Figure 22:
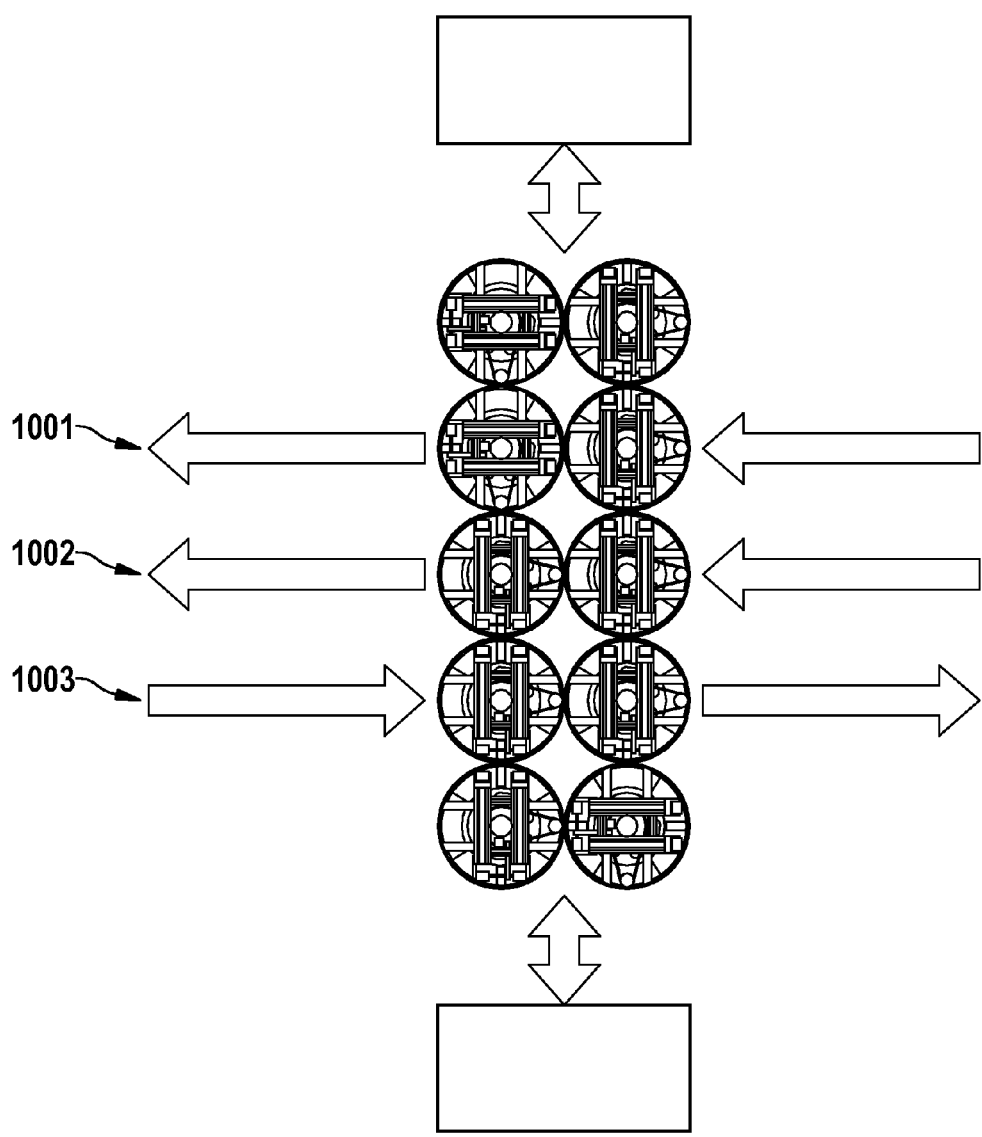
FIG. 22 shows a fifth option for transporting a transport container with the fifth exemplary embodiment of a transfer device according to FIG. 10.

FIG. 21 shows the mirrored arrangement with respect to FIG. 19 and FIG. 22 shows the mirrored arrangement with respect to FIG. 20.

Figure 23:
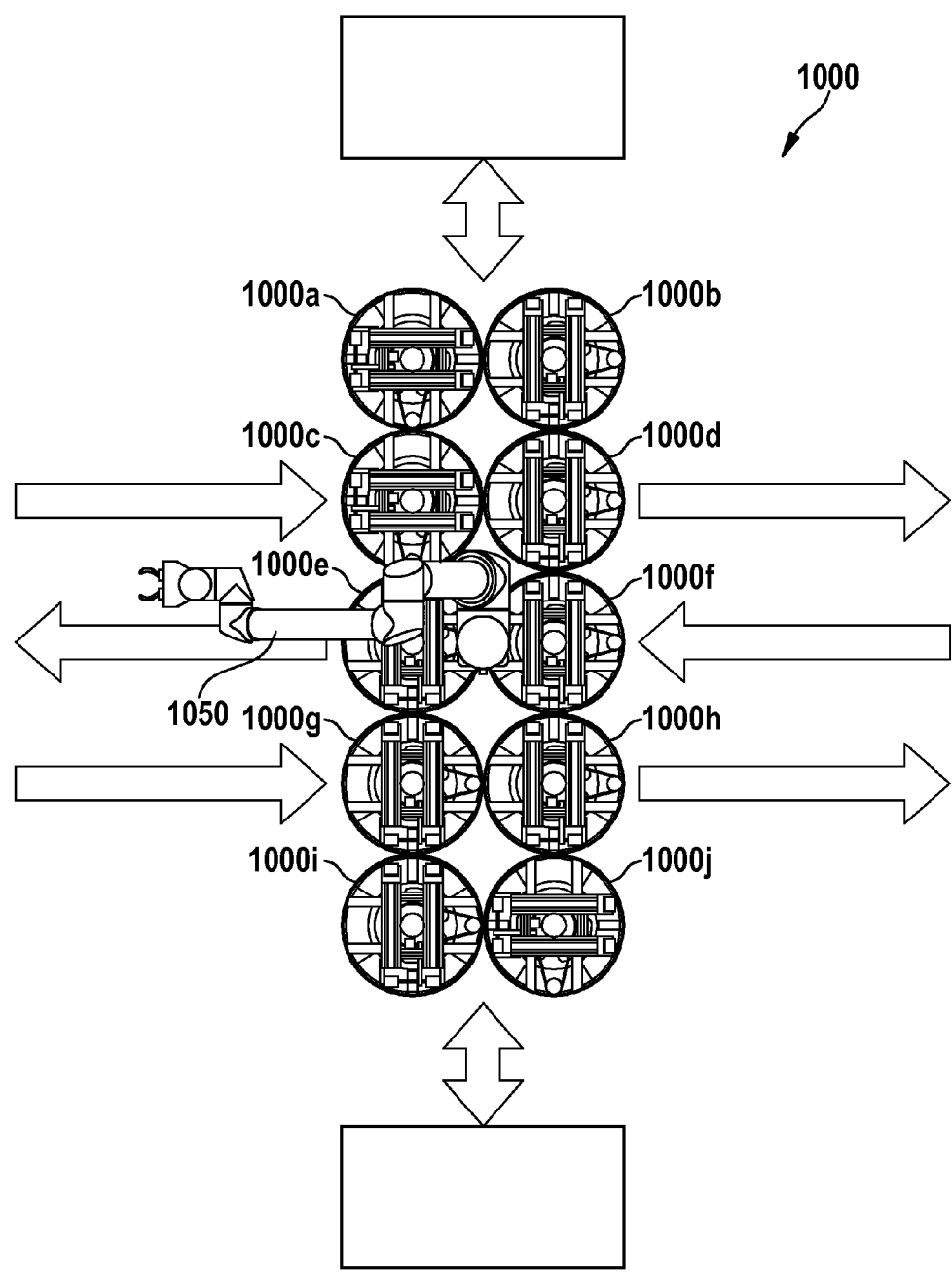
FIG. 23 shows the fifth exemplary embodiment of a transfer device according to FIG. 10 with a centrally arranged robot for equipping a transport container or for repositioning the transport container.
Figure 24:
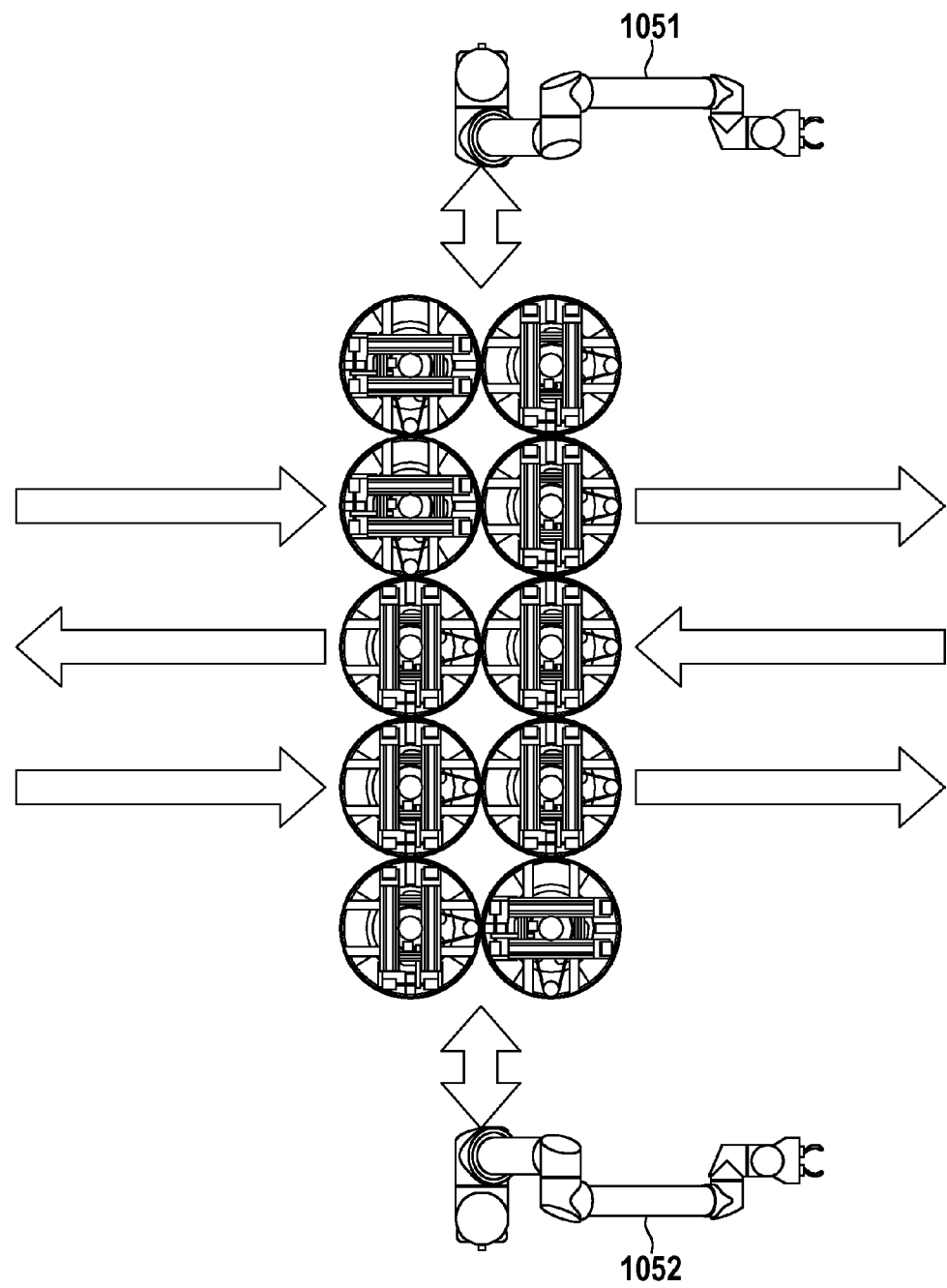
FIG. 24 shows the fifth exemplary embodiment of a transfer device according to FIG. 10 with two robots arranged in decentralized fashion for equipping a transport container or for repositioning the transport container.
Figure 25:
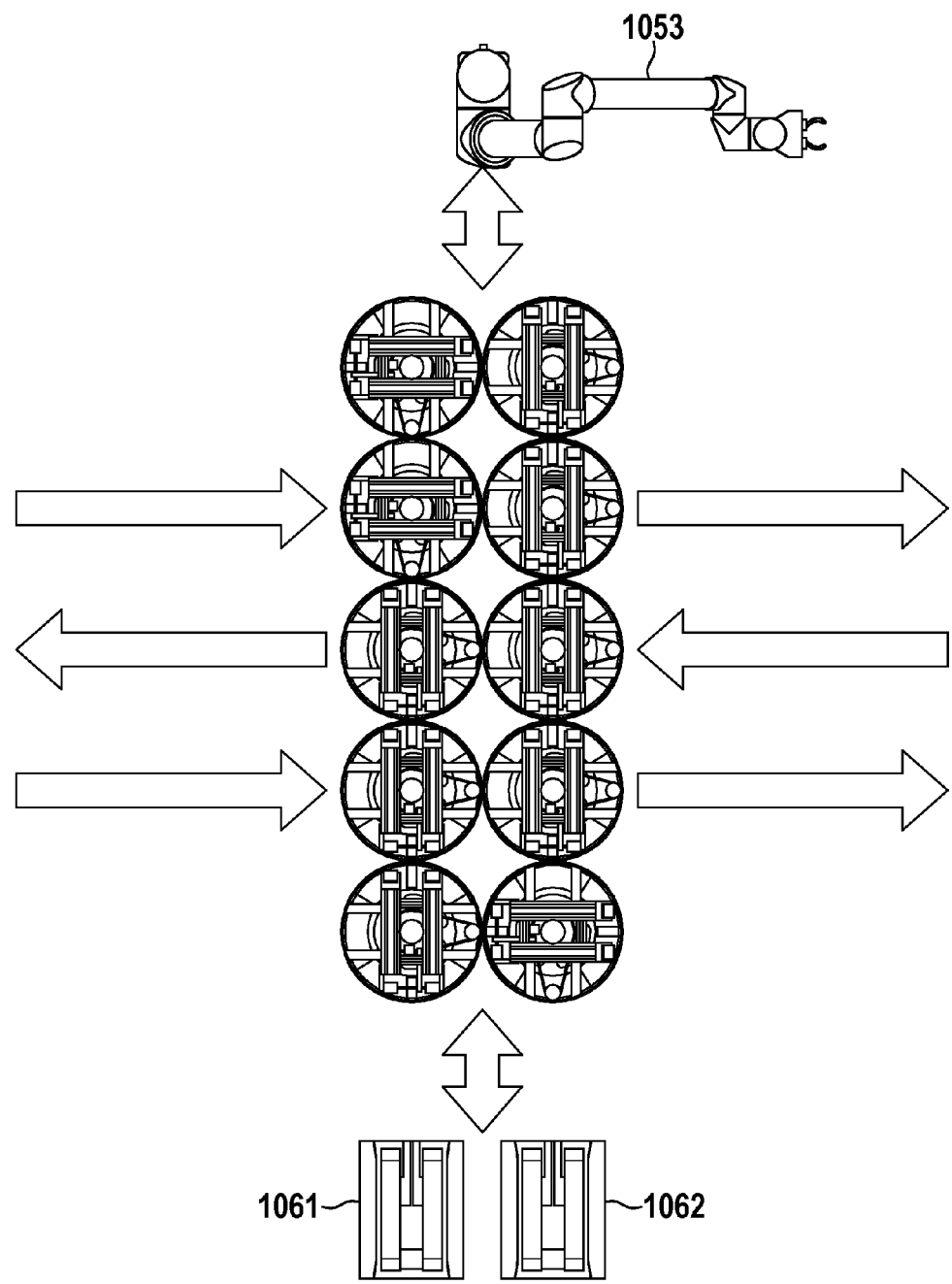
FIG. 25 shows the fifth exemplary embodiment of a transfer device according to FIG. 10 with a robot arranged in decentralized fashion for equipping a transport container or for repositioning the transport container and with a connection to conventional conveyor technology.

FIGS. 23 to 25 show the transfer device 1000 according to FIG. 10, in which robots are additionally provided. FIG. 23 shows a configuration in which a central robot 1050 is present. It can be used for centralized equipping of the process devices 1021, 1022 and/or of the individual rotation/transport devices 1000a, 1000b, 1000c, ... 1000i, 1000j. FIG. 24 shows a configuration in which two decentralized robots 1051, 1052 are present. These can be used for decentralized equipping of the process stations 1021, 1022 and/or of the individual rotation/transport devices 1000a, 1000b, 1000c, ... 1000i, 1000j. FIG. 25 shows a configuration in which a decentralized robot 1053 is present. It can be used for decentralized equipping of the process devices 1021, 1022 and/or of the individual rotation/transport devices 1000a, 1000b, 1000c, ... 1000i, 1000j. Two transport devices 1061, 1062 are present at the other end side, the right process device 1022 being able to be supplied therewith. In addition to repositioning the transport container, this arrangement can also implement a connection to conventional conveyor technology, as explained further in FIG. 26.

Figure 26:
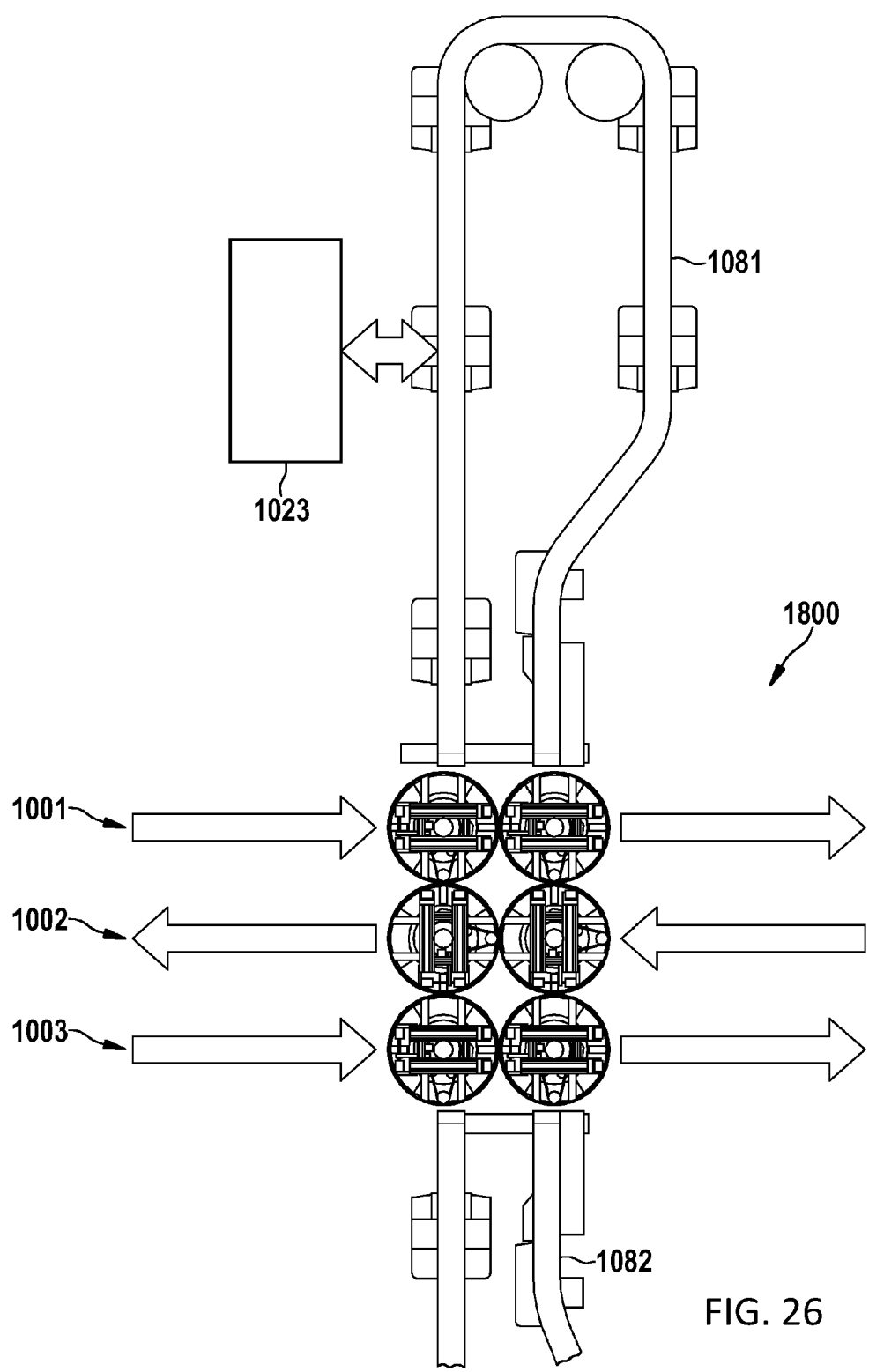
FIG. 26 shows a thirteenth exemplary embodiment of a transfer device with a two-sided connection to conventional conveyor technology.

FIG. 26 shows a thirteenth exemplary embodiment of the transfer device 1800 in the form of a 3×2 matrix with a two-sided connection to conventional conveyor technology. Conventional conveyor tracks 1081, 1082, which allow the process device is 1023 to be approached, are arranged to the left and to the right of the transfer device 1800.

Typical exemplary embodiments of the disclosure are the subject matter of the clauses specified below within the meaning of decision J15/88:

a) Clause 1. A transfer device (140, 141, 142, ... 149, 144A, 244, 744, 1000, 1100, 1200, ... 1700, 1800) for a transport container (701, 702), comprising a plurality of rotation/transport devices (144a, 144b, 144c, ... 144i, 144j 144k, 144l, 144Za, 144Zb, ... 244a, 244b, 744a, 1000a, 1000b ... ) arranged in matrix-like fashion, wherein each of the rotation/transport devices (144a, 144b, 144c, ... 144i, 144j 144k, 144l, 144Za, 144Zb, ... 244a, 244b, 744a, 1000a, 1000b ... ) has a bearing (202a, 202b) for the transport container (701, 702), wherein the bearing (202a, 202b) is embodied at least as a three-point bearing.

Clause 2. The transfer device (140, 141, 142, ... 149, 144A, 244, 744, 1000, 1100, 1200, ... 1700, 1800) according to clause 1, wherein the bearing (202a, 202b) is formed by one or more belt conveyors (202a, 202b), by one or more link chains, by one or more belts or by one or more rollers.

Clause 3. The transfer device (140, 141, 142, ... 149, 144A, 244, 744, 1000, 1100, 1200, ... 1700, 1800) according to either of the preceding clauses, wherein the bearing (202a, 202b) is alignable in discrete steps.

Clause 4. The transfer device (140, 141, 142, ... 149, 144A, 244, 744, 1000, 1100, 1200, ... 1700, 1800) according to clause 3, wherein the bearing (202a, 202b) is alignable in 45° steps.

Clause 5. The transfer device (140, 141, 142, ... 149, 144A, 244, 744, 1000, 1100, 1200, ... 1700, 1800) according to any one of the preceding clauses, wherein the bearing (202a, 202b) is alignable in discrete orientations.

Clause 6. The transfer device (140, 141, 142, ... 149, 144A, 244, 744, 1000, 1100, 1200, ... 1700, 1800) according to clause 5, wherein the bearing (202a, 202b) is alignable in exactly three discrete orientations or in exactly four discrete orientations or in exactly five discrete orientations or in exactly six discrete orientations or in exactly seven discrete orientations or in exactly eight discrete orientations.

Clause 7. The transfer device (140, 141, 142, ... 149, 144A, 244, 744, 1000, 1100, 1200, ... 1700, 1800) according to any one of the preceding clauses, wherein the arrangement of the rotation/transport devices (144a, 144b, 144c, ... 144i, 144j 144k, 144l, 144Za, 144Zb, ... 244a, 244b, 744a, 1000a, 1000b ... ) forms a 3×2 matrix, a 4×2 matrix, a 5×2 matrix, a 3×3 matrix or a 3×4 matrix, or wherein the arrangement of the rotation/transport devices (144a, 144b, 144c, ... 144i, 144j 144k, 144l, 144Za, 144Zb, ... 244a, 244b, 744a, 1000a, 1000b ... ) forms a combined 2×4+(2×2) matrix or a combined 3×4+(2×2) matrix.

Clause 8. The transfer device (140, 141, 142, ... 149, 144A, 244, 744, 1000, 1100, 1200, ... 1700, 1800) according to any one of the preceding clauses, wherein
each of the rotation/transport devices (144*a*, 144*b*, 144*c*, ... 144*i*, 144*j* 144*k*, 144*l*, 144Za, 144Zb, ... 244*a*, 244*b*, 744*a*, 1000*a*, 1000*b* ... ) has a dedicated drive (203, 263) for rotation purposes and/or wherein each of the rotation/transport devices (144*a*, 144*b*, 144*c*, ... 144*i*, 144*j* 144*k*, 144*l*, 144Za, 144Zb, ... 244*a*, 244*b*, 744*a*, 1000*a*, 1000*b* ... ) has a dedicated drive (201, 261) for transportation purposes.

Clause 9. The transfer device (140, 141, 142, ... 149, 144A, 244, 744, 1000, 1100, 1200, ... 1700, 1800) according to clause 8, wherein
the drive (203, 263) for rotation purposes has a reversible embodiment and/or wherein
the drive (201, 261) for transportation purposes has a reversible embodiment.

Clause 10. The transfer device (140, 141, 142, ... 149, 144A, 244, 744, 1000, 1100, 1200, ... 1700, 1800) according to any one of the preceding clauses, wherein each of the rotation/transport devices (144*a*, 144*b*, 144*c*, ... 144*i*, 144*j* 144*k*, 144*l*, 144Za, 144Zb, ... 244*a*, 244*b*, 744*a*, 1000*a*, 1000*b* ... ) has a coupling device (745*a*, 745*b*, 745*c*) that is complementary to another of the rotation/transport devices (144*a*, 144*b*, 144*c*, ... 144*i*, 144*j* 144*k*, 144*l*, 144Za, 144Zb, ... 244*a*, 244*b*, 744*a*, 1000*a*, 1000*b* ... ).

Clause 11. The transfer device (140, 141, 142, ... 149, 144A, 244, 744, 1000, 1100, 1200, ... 1700, 1800) according to clause 10, wherein the complementary coupling device (745*a*, 745*b*, 745*c*) is embodied to form a complementary mechanical coupling (746*a*, 746*b*, 746*c*) and/or a complementary open-loop and/or closed-loop control-type coupling.

Clause 12. The transfer device (140, 141, 142, ... 149, 144A, 244, 744, 1000, 1100, 1200, ... 1700, 1800) according to any one of the preceding clauses, wherein each of the rotation/transport devices (144*a*, 144*b*, 144*c*, ... 144*i*, 144*j* 144*k*, 144*l*, 144Za, 144Zb, ... 244*a*, 244*b*, 744*a*, 1000*a*, 1000*b* ... ) has a grid dimension (R×R) of between 20 cm×20 cm and 50 cm×50 cm.

Clause 13. The transfer device (140, 141, 142, ... 149, 144A, 244, 744, 1000, 1100, 1200, ... 1700, 1800) clause 12, wherein the bearing (202*a*, 202*b*) covers no more than 50% of an area defined by the grid dimension (R×R).

Clause 14. The transfer device (140, 141, 142, ... 149, 144A, 244, 744, 1000, 1100, 1200, ... 1700, 1800) according to any one of the preceding clauses, wherein each of the rotation/transport devices (144*a*, 144*b*, 144*c*, ... 144*i*, 144*j* 144*k*, 144*l*, 144Za, 144Zb, ... 244*a*, 244*b*, 744*a*, 1000*a*, 1000*b* ... ) has a detection device (210) for the transport container (701, 702).

Clause 15. The transfer device (140, 141, 142, ... 149, 144A, 244, 744, 1000, 1100, 1200, ... 1700, 1800) according to any one of the preceding clauses, wherein each of the rotation/transport devices (144*a*, 144*b*, 144*c*, ... 144*i*, 144*j* 144*k*, 144*l*, 144Za, 144Zb, ... 244*a*, 244*b*, 744*a*, 1000*a*, 1000*b* ... ) has a status reporting device (220).

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A transfer device for a transport container configured to receive at least two spectacle lens blanks adjacent to one another, the transfer device comprising:
a plurality of rotation/transport devices arranged directly adjoining one another in a form of a 3×2 matrix, wherein the 3×2 matrix defines a table structure with fields that are assigned to 3 rows and 2 columns and the plurality of rotation/transport devices are arranged on the fields of the table in a plan view,
wherein each rotation/transport device of the plurality of rotation/transport devices includes a dedicated rotation drive configured to rotate the transport container,
wherein each rotation/transport devices of the plurality of rotation/transport devices includes a dedicated transportation drive configured to transport the transport container,
wherein the dedicated transportation drive is a bearing,
wherein the bearing has at least three bearing points configured to bear the transport container in its entirety,
wherein each rotation/transport device of the plurality of rotation/transport devices has a grid dimension of from 20 cm×20 cm to 50 cm×50 cm,
wherein the bearing is configured to receive one or more of the transport containers,
wherein the dedicated rotation drive is configured to align the bearing in discrete steps in mutually perpendicular directions to alternatively transfer a respective transport container between the rotation/transport devices of one of the rows and the rotation/transport devices of one of the columns of the 3×2 matrix, and
wherein the dedicated rotation drive is further configured to transfer the respective transport container in at least three different directions.

2. The transfer device as claimed in claim 1, wherein the bearing is a belt conveyor, a link chain, a belt, or a roller.

3. The transfer device as claimed in claim 1, wherein at least one of:
the dedicated rotation drive is configured to rotate reversibly, or
the dedicated transportation drive is configured to reverse a transportation direction.

4. The transfer device as claimed in claim 1, wherein each rotation/transport devices further comprises:
a coupling device that is complementary to another of the rotation/transport device of the plurality of the rotation/transport devices.

5. The transfer device as claimed in claim 4, wherein the complementary coupling device is configured as at least one of:
a complementary mechanical coupling;
a complementary open-loop control coupling; or
a closed-loop control coupling.

6. The transfer device as claimed in claim 1, wherein the bearing covers no more than 50% of an area defined by the grid dimension.

7. The transfer device as claimed in claim 1, wherein each rotation/transport devices further comprises:
   a detection device configured to detect the transport container.

8. The transfer device as claimed in claim 1, wherein each rotation/transport devices further comprises:
   a status reporting device.

9. A transfer device for a transport container configured to receive at least two spectacle lens blanks adjacent to one another, the transfer device comprising:
   a plurality of rotation/transport devices arranged directly adjoining one another in a form of a 3×2 matrix, wherein the 3×2 matrix defines a table structure with fields that are assigned to 3 rows and 2 columns and the plurality of rotation/transport devices are arranged on the fields of the table in a plan view,
   wherein each rotation/transport devices of the plurality of rotation/transport devices includes a dedicated rotation drive configured to rotate the transport container,
   wherein each rotation/transport device of the plurality of rotation/transport devices includes a dedicated transportation drive configured to transport the transport container,
   wherein the dedicated transportation drive is a bearing,
   wherein the bearing has at least three bearing points configured to bear the transport container in its entirety,
   wherein the bearing is a belt conveyor, a link chain, a belt, or a roller,
   wherein each rotation/transport device of the plurality of rotation/transport devices has a grid dimension of from 20 cm×20 cm to 50 cm×50 cm,
   wherein the bearing is configured to receive one or more of the transport containers, and
   wherein the dedicated rotation drive is configured to align the bearing in discrete steps in mutually perpendicular directions to alternatively transfer a respective transport container between the rotation/transport devices of one of the rows and the rotation/transport devices of one of the columns of the 3×2 matrix, and
   wherein the dedicated rotation drive is further configured to transfer the respective transport container in at least three different directions.

10. The transfer device as claimed in claim 9, wherein each rotation/transport devices further comprises:
    a coupling device that is complementary to another of the rotation/transport device of the plurality of the rotation/transport devices.

11. The transfer device as claimed in claim 10, wherein the complementary coupling device is configured as at least one of:
    a complementary mechanical coupling;
    a complementary open-loop control coupling; or
    a closed-loop control coupling.

12. The transfer device as claimed in claim 9, wherein the bearing covers no more than 50% of an area defined by the grid dimension.

13. The transfer device as claimed in claim 9, wherein each rotation/transport devices further comprises:
    a detection device configured to detect the transport container.

14. A transfer device for a transport container configured to receive at least two spectacle lens blanks adjacent to one another, the transfer device comprising:
    a plurality of rotation/transport devices arranged directly adjoining one another in a form of a 3×2 matrix, wherein the 3×2 matrix defines a table structure with fields that are assigned to 3 rows and 2 columns and the plurality of rotation/transport devices are arranged on the fields of the table in a plan view,
    wherein each rotation/transport devices of the plurality of rotation/transport devices includes a dedicated rotation drive configured to rotate the transport container,
    wherein each rotation/transport device of the plurality of rotation/transport devices includes a dedicated transportation drive configured to transport the transport container,
    wherein the bearing has at least three bearing points configured to bear the transport container in its entirety,
    wherein the bearing is a belt conveyor, a link chain, a belt, or a roller,
    wherein the dedicated rotation drive is a bearing and the dedicated transportation drive is the bearing,
    wherein the dedicated rotation drive is configured to rotate reversibly,
    wherein the dedicated transportation drive is configured to reverse a transportation direction,
    wherein each rotation/transport device of the plurality of rotation/transport devices has a grid dimension of from 20 cm×20 cm to 50 cm×50 cm,
    wherein the bearing is configured to receive one or more of the transport containers, and wherein the dedicated rotation drive is configured to align the bearing in discrete steps in mutually perpendicular directions to alternatively transfer a respective transport container between the rotation/transport devices of one of the rows and the rotation/transport devices of one of the columns of the 3×2 matrix.

15. The transfer device as claimed in claim 14, wherein each rotation/transport devices further comprises:
    a coupling device that is complementary to another of the rotation/transport device of the plurality of the rotation/transport devices.

16. The transfer device as claimed in claim 15, wherein the complementary coupling device is configured as at least one of:
    a complementary mechanical coupling;
    a complementary open-loop control coupling; or
    a closed-loop control coupling.

17. The transfer device as claimed in claim 14, wherein the bearing covers no more than 50% of an area defined by the grid dimension.

18. The transfer device as claimed in claim 14, wherein each rotation/transport devices further comprises:
    a detection device configured to detect the transport container.

19. A method for producing a spectacle lens from a spectacle lens blank, the method comprising:
    transporting the spectacle lens blank in a transport container configured to receive at least two spectacle lens blanks adjacent to one another, with a transfer device including:
    a plurality of rotation/transport devices arranged directly adjoining one another in a form of a 3×2 matrix, wherein the 3×2 matrix defines a table structure with fields that are assigned to 3 rows and 2 columns and the plurality of rotation/transport devices are arranged on the fields of the table in a plan view,
    wherein each rotation/transport devices of the plurality of rotation/transport devices includes a dedicated rotation drive configured to rotate the transport container,
    wherein each rotation/transport device of the plurality of rotation/transport devices includes a dedicated transportation drive configured to transport the transport container, wherein the bearing has at least three bearing points configured to bear the transport container in its entirety, wherein the bearing is a belt conveyor, a link chain, a belt, or a roller, wherein the dedicated rotation drive is a bearing and the dedicated transportation drive is the bearing, wherein the dedicated rotation drive is configured to rotate reversibly, wherein the dedicated transportation drive is configured to reverse a transportation direction, wherein each rotation/transport device of the plurality of rotation/transport devices has a grid dimension of from 20 cm×20 cm to 50 cm×50 cm, wherein the bearing is configured to receive one or more of the transport containers, and wherein the dedicated rotation drive is configured to align the bearing in discrete steps in mutually perpendicular directions to alternatively transfer a respective transport container between the rotation/transport devices of one of the rows and the rotation/transport devices of one of the columns of the 3×2 matrix.

20. The method as claimed in claim 19, wherein the transportation is performed between different process devices of a process line.

\* \* \* \* \*

UNITED STATES PATENT AND TRADEMARK OFFICE
CERTIFICATE OF CORRECTION

PATENT NO. : 10,773,894 B2
APPLICATION NO. : 16/445434
DATED : September 15, 2020
INVENTOR(S) : Ralf Meschenmoser, Arne Schulz and Dennis Klora Page 1 of 1

It is certified that error appears in the above-identified patent and that said Letters Patent is hereby corrected as shown below:

In the Claims

Column 21, Line 17, Claim 9, change "devices" to -- device --.

Column 22, Line 3, Claim 14, change "devices" to -- device --.

Column 22, Line 61, Claim 19, change "devices" to -- device --.

Signed and Sealed this
Twenty-second Day of December, 2020

Andrei Iancu
*Director of the United States Patent and Trademark Office*